US009705732B2

(12) United States Patent
Kim et al.

(10) Patent No.: US 9,705,732 B2
(45) Date of Patent: Jul. 11, 2017

(54) METHOD AND APPARATUS FOR SHARING TIME INFORMATION IN AN ELECTRONIC DEVICE

(71) Applicant: Samsung Electronics Co., Ltd., Suwon-si, Gyeonggi-do (KR)

(72) Inventors: Kwang-Tai Kim, Suwon-si (KR); Ji-Hyun Kim, Seoul (KR); Da-Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 14/080,317

(22) Filed: Nov. 14, 2013

(65) Prior Publication Data
US 2014/0181283 A1    Jun. 26, 2014

(30) Foreign Application Priority Data
Dec. 24, 2012   (KR) .................. 10-2012-0152333

(51) Int. Cl.
*G06F 15/173*   (2006.01)
*H04L 12/24*    (2006.01)
*G06Q 10/10*    (2012.01)

(52) U.S. Cl.
CPC ............ *H04L 41/02* (2013.01); *G06Q 10/10* (2013.01); *G06Q 10/109* (2013.01)

(58) Field of Classification Search
USPC ................. 709/204, 206, 223, 224
See application file for complete search history.

(56) References Cited

U.S. PATENT DOCUMENTS

| 2006/0133357 | A1* | 6/2006 | Lee | G01S 1/68 370/352 |
| 2006/0187900 | A1* | 8/2006 | Akbar | 370/352 |
| 2007/0274251 | A1* | 11/2007 | Hagihara | 370/328 |
| 2008/0153474 | A1* | 6/2008 | Scott | 455/418 |
| 2009/0016509 | A1* | 1/2009 | Shah | 379/142.11 |
| 2009/0164283 | A1* | 6/2009 | Coley | G06Q 10/06311 705/7.13 |
| 2011/0081920 | A1* | 4/2011 | Hung | G06Q 10/109 455/456.3 |

(Continued)

FOREIGN PATENT DOCUMENTS

KR    10-2005-0116102 A    12/2005
KR    10-2007-0023225 A     2/2007

OTHER PUBLICATIONS

Amtsblatt EPA, Official Journal EPO, Journal officiel OEB, Notice from the European Patent Office dated Oct. 1, 2007 concerning business methods, XP007905525, Oct. 1, 2007.

*Primary Examiner* — Liangche A Wang
(74) *Attorney, Agent, or Firm* — Jefferson IP Law, LLP

(57) ABSTRACT

A method for operating an electronic device is provided. The method includes identifying time information of at least one counterpart electronic device, displaying the time information of the counterpart electronic device when an application program for displaying time information is executed, when time change information of the counterpart electronic device is received, changing the time information of the counterpart electronic device according to the time change information, and displaying changed time information of the counterpart electronic device when the application program for displaying time information is executed.

15 Claims, 25 Drawing Sheets

(56) References Cited

U.S. PATENT DOCUMENTS

2011/0151415 A1\* 6/2011 Darling ............... G04G 9/0076
434/149
2013/0109361 A1\* 5/2013 Felt ........................... 455/414.1

\* cited by examiner

METHOD AND APPARATUS FOR SHARING TIME INFORMATION IN AN ELECTRONIC DEVICE

CROSS-REFERENCE TO RELATED APPLICATION(S)

This application claims the benefit under 35 U.S.C. §119 (a) of a Korean patent application filed on Dec. 24, 2012 in the Korean Intellectual Property Office and assigned Serial No. 10-2012-0152333, the entire disclosure of which is hereby incorporated by reference.

TECHNICAL FIELD

The present disclosure relates to an electronic device. More particularly, the present disclosure relates to a method and apparatus for sharing time information in an electronic device.

BACKGROUND

Electronic devices such as mobile terminals have effectively become necessities for most people due to their advanced features and portability. For example, with the development of communication technology, portable electronic devices have evolved into multimedia devices that provide various multimedia services using data communication service as well as a voice communication service.

Based on the increased number of users, information exchange between users using the voice communication service and data communication service has increased. However, when users who want to exchange information with each other are located at different areas having different standard times, the user of a portable electronic device may not recognize the time information of the area where a counterpart user is located. In that case, the user may not use the communication service with the counterpart user smoothly. For example, when a first electronic device located in Seoul transmits a message to a second electronic device located in New York and the local time in Seoul is 4 p.m., the second electronic device may receive the message at 3 a.m., which is the local time in New York. Therefore, the user of the second electronic device may not easily recognize the reception of the message from the first electronic device, so that the user of the second electronic device may not use a messenger service with the first electronic device smoothly.

Therefore, there exists a need for sharing time information between counterpart portable electronic devices for a smooth communication service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for sharing time information with a counterpart electronic device in an electronic device.

Another aspect of the present disclosure is to provide an apparatus and method for sharing time information with a counterpart electronic device for a communication service in an electronic device.

Another aspect of the present disclosure is to provide an apparatus and method for transmitting time information to a counterpart electronic device for a communication service when a standard time is changed in an electronic device.

Another aspect of the present disclosure is to provide an apparatus and method for sharing time information with a counterpart electronic device for a communication service using a server in an electronic device.

Another aspect of the present disclosure is to provide an apparatus and method for transmitting time information to a counterpart electronic device for a communication service using a server when a standard time is changed in an electronic device.

Another aspect of the present disclosure is to provide an apparatus and method for displaying time sharing information associated with a counterpart electronic device for a communication service in an electronic device.

Another aspect of the present disclosure is to provide an apparatus and method for displaying time information of a counterpart electronic device before using a communication service in an electronic device.

In accordance with an aspect of the present disclosure, a method for operating an electronic device is provided. The method includes identifying time information of at least one counterpart electronic device, displaying the time information of the counterpart electronic device when an application program for displaying time information is executed, when time change information of the counterpart electronic device is received, changing the time information of the counterpart electronic device according to the time change information, and displaying changed time information of the counterpart electronic device when the application program for displaying time information is executed.

In accordance with another aspect of the present disclosure, a method for operating an electronic device is provided. The method includes when a time sharing request signal is received from a counterpart electronic device, determining whether to share time with the counterpart electronic device, when sharing the time with the counterpart electronic device, transmitting time information to the counterpart electronic device, determining whether the time information of the electronic device is changed, and when the time information of the electronic device is changed, transmitting time change information of the electronic device to the counterpart electronic device.

In accordance with yet another aspect of the present disclosure, an electronic device is provided. The electronic device includes a display unit, at least one processor, a memory and a program stored in the memory and configured to be executable by the processor, wherein the program transmits a time sharing request signal to a counterpart electronic device, receives time information of the counterpart electronic device, displays the time information of the counterpart electronic device when an application program for displaying time information is executed, when time change information of the counterpart electronic device is received, changes the time information of the counterpart electronic device according to the time change information, and displays changed time information of the counterpart electronic device when the application program for displaying time information is executed.

In accordance with still another aspect of the present disclosure, an electronic device is provided. The electronic device includes a display unit, at least one processor, a memory and a program stored in the memory and configured to be executable by the processor, wherein the program, when a time sharing request signal is received from a counterpart electronic device, determines whether to share time with the counterpart electronic device, when sharing the time with the counterpart electronic device, transmits time information to the counterpart electronic device, determines whether the time information of the electronic device is changed, and when the time information of the electronic device is changed, transmits time change information of the electronic device to the counterpart electronic device.

In accordance with still another aspect of the present disclosure, an electronic device is provided. The electronic device includes a communication unit, a display unit, and at least one processor, wherein the processor is configured to identify the time information of a counterpart electronic device, to display the time information of the counterpart electronic device when an application program for displaying time information is executed, to, when time change information of the counterpart electronic device is received, change the time information of the counterpart electronic device according to the time change information, and to display changed time information of the counterpart electronic device when the application program for displaying time information is executed.

In accordance with another aspect of the present disclosure, an electronic device is provided. The electronic device includes a communication unit, a display unit, and at least one processor, wherein the processor is configured to, when a time sharing request signal is received from a counterpart electronic device, determine whether to share time with the counterpart electronic device, to, when sharing the time with the counterpart electronic device, transmit time information to the counterpart electronic device, to determine whether the time information of the electronic device is changed, and to, when the time information of the electronic device is changed, transmit time change information of the electronic device to the counterpart electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a technique for sharing time information with other electronic devices in an electronic device.

In the following description, examples of the electronic device include a mobile communication terminal, a Personal Digital Assistant (PDA), a Personal Computer (PC), a laptop computer, a smart phone, a netbook, a television, a Mobile Internet Device (MID), an Ultra Mobile Personal Computer (UMPC), a tablet PC, a navigation device, a watch, a smart TV, an MP3 player, and the like.

In the following description, time information may include at least one of the local time of the area in which the electronic device is located and location information of the electronic device, with which the local time of the electronic device may be estimated.

Figure 1:
FIG. 1 is a diagram illustrating a configuration for enabling electronic devices to share time information according to an embodiment of the present disclosure.

FIG. 1 is a diagram illustrating a configuration for enabling electronic devices to share time information according to an embodiment of the present disclosure.

Referring to FIG. 1, when a first electronic device 100 and a second electronic device 110 want to share time information, the first electronic device 100 may make a request to the second electronic device 110 for time sharing. For example, the first electronic device 100 may transmit a control signal for the time sharing request to the second electronic device 110. As another example, the first electronic device 100 may transmit a message including the time sharing request to the second electronic device 110. In this case, the first electronic device 100 may transmit at least one of the time information and authentication information of the first electronic device 100 along with the time sharing request information to the second electronic device 110. In this case, the second electronic device 110 may include at least one counterpart electronic device selected by the user of the first electronic device 100 for sharing of time information.

The second electronic device 110 determines whether to share time information with the first electronic device 100 when receiving the time sharing request information of the first electronic device 100. For example, the second electronic device 110 may determine whether to share time information with the first electronic device 100 based on the authentication information of the first electronic device 100 included in the time sharing request information.

When it is determined to share time information with the first electronic device 100, the second electronic device 110 transmits the time information of the second electronic device 110 to the first electronic device 100. In this case, the second electronic device 110 may identify the time information of the first electronic device 100 included in the time sharing request information and display the time information so as to allow a user to view it.

When receiving the time information from the second electronic device 110, the first electronic device 100 displays the time information of the second electronic device 110 so as to allow the user of the first electronic device 100 to view it.

Thereafter, when the time information (e.g., standard time or local time) of the first electronic device 100 is changed, the first electronic device 100 transmits time change information to the second electronic device 110. Therefore, the second electronic device 110 may update the time information associated with the first electronic device 100 according to the time change information provided by the first electronic device 100.

In addition, when the time information (e.g., standard time or local time) of the second electronic device 110 is changed, the second electronic device 110 transmits time change information to the first electronic device 100. Accordingly, the first electronic device 100 may update the time information associated with the second electronic device 110 according to the time change information provided by the second electronic device 110.

Figure 2:
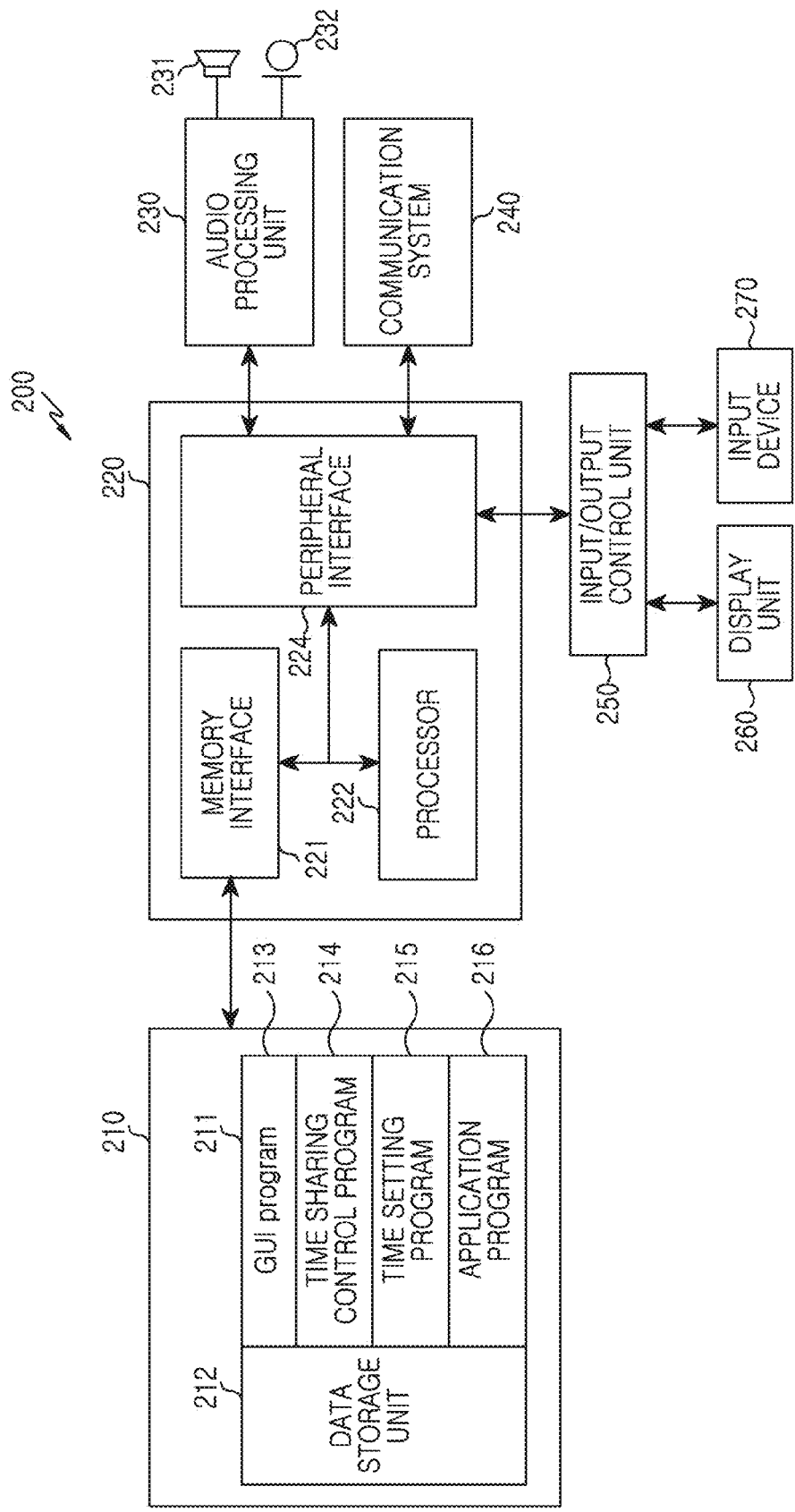
FIG. 2 is a diagram illustrating a block configuration of an electronic device according to an embodiment of the present disclosure.

In order to share time information as described above, either or both of the electronic devices 100 and 110 may be configured as illustrated in FIG. 2.

FIG. 2 is a diagram illustrating a block configuration of an electronic device according to an embodiment of the present disclosure.

Referring to FIG. 2, the electronic device 200 includes a memory 210, a processor unit 220, an audio processing unit 230, a communication system 240, an input/output control unit 250, a display unit 260, and an input device 270. In this case, the memory 210 may be provided in plurality. In an embodiment, the first electronic device 100 and the second electronic device 110 are configured identically to each other, and the operation of the first electronic device 100 and the operation of the second electronic device 110 will be described using one block configuration.

The memory 210 may include a program storage unit 211 for storing a program for controlling an operation of the electronic device 200, and a data storage unit 212 for storing data generated during the execution of a program.

The program storage unit 211 includes a Graphic User Interface (GUI) program 213, a time sharing control program 214, a time setting program 215, and at least one application program 216. In this case, the programs stored in the program storage unit 211 may be expressed as an instruction set that is a collection of instructions.

The data storage unit 212 stores the time information of at least one counterpart electronic device identified through the time sharing control program 214 and the time information of the electronic device 200 identified through the time setting program 215.

The GUI program 213 includes at least one software component for providing a graphic user interface on the display unit 260. For example, the GUI program 213 may display information about application programs executed by a processor 222 on the display unit 260. As another example, the GUI program 213 may display the time information of a counterpart electronic device that performs time sharing through the time sharing control program 214 on the display unit 260.

The time sharing control program 214 includes at least one software component for sharing time information with the at least one counterpart electronic device.

When a time sharing event occurs, the time sharing control program 214 may transmit time sharing request information to the at least one counterpart electronic device. In this case, the time sharing control program 214 may transmit at least one of the time information and authentication information of the electronic device 200 along with the time sharing request information. Thereafter, the time sharing control program 214 may identify the time information of the at least one counterpart electronic device received through the communication system 240. For example, when receiving the location information of the counterpart electronic device, the time sharing control program 214 may identify the time information of the counterpart electronic device using global time information and the location information of the counterpart electronic device stored in the data storage unit 212. In this case, the time sharing control program 214 may select at least one counterpart electronic device for sharing of time information according to input information provided from the input device 270.

When time sharing request information is received through the communication system 240, the time sharing control program 214 may determine whether to share time information with the counterpart electronic device according to a time sharing request. For example, the time sharing control program 214 may display the time sharing request information on the display unit 260. Thereafter, the time sharing control program 214 may determine whether to share time information with the at least one counterpart electronic device according to input information provided from the input device 270. As another example, the time sharing control program 214 may determine whether to share time information with the at least one counterpart electronic device based on the authentication information of the counterpart electronic device that requests time sharing.

When the time information is determined to be shared with the counterpart electronic device, the time sharing control program 214 performs control to transmit response information including the time information of the electronic device 200 to the counterpart electronic device through the communication system 240. On the other hand, when the time information is determined not to be shared with the counterpart electronic device, the time sharing control program 214 performs control to transmit response information indicating that the sharing of time information is not permitted to the counterpart electronic device through the communication system 240.

When the time information (e.g., local time) of the electronic device 200 is changed by the time setting program 215, the time sharing control program 214 may transmit the time change information of the electronic device 200 to the at least one counterpart electronic device that performs time sharing.

When time change information is received from at least one counterpart electronic device through the communication system 240, the time sharing control program 214 may update the time information of the at least one counterpart electronic device in which time information is changed.

The time setting program 215 includes at least one software component for setting the time information of the electronic device 200. For example, the time setting program 215 may identify the time information of an area in which the electronic device 200 is located by using Network Identity and Time Zone (NITZ) information received through the communication system 240. As another example, the time setting program 215 may identify the time information of the area in which the electronic device 200 is located by using a Global Positioning System (GPS) signal.

The application program 216 includes a software component for at least one application program installed in the electronic device 200.

The processor unit 220 may include a memory interface 221, at least one processor 222, and a peripheral interface 224. In this case, the memory interface 221, the at least one processor 222 and the peripheral interface 224 which are included in the processor unit 220 may be integrated into at least one integrated circuit or be implemented as separate components.

The memory interface 221 controls access to the memory 210 of components, such as the processor 222 or the peripheral interface 224.

The peripheral interface 224 controls connections of the input/output peripherals of the electronic device 200 to the processor 222 and the memory interface 221.

The processor 222 enables the electronic device 200 to provide various multimedia services using at least one software program. In this case, the processor 222 executes at least one program stored in the memory 210 and provides a service corresponding to the program. For example, the processor 222 may execute the time sharing control program 214 stored in the program storage unit 211 and share time information with the counterpart electronic device.

The audio processing unit 230 provides an audio interface between a user and the electronic device 200 through a speaker 231 and a microphone 232.

The communication system 240 provides a communication function for voice communication and data communication. For example, the communication system 240 transmits the time sharing request information and the time change information to the at least one counterpart electronic device according to control of the time sharing control program 214. In addition, the communication system 240 may receive time information and time change information from the at least one counterpart electronic device that performs time sharing.

In this case, the communication system 240 may be classified into a plurality of communication sub-modules which support different communication networks. For example, the communication networks may include, but are not limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless Local Area Network (LAN), a Bluetooth network, a Near Field Communication (NFC) network, and the like.

The input/output control unit 250 provides an interface between an input/output device, such as the display unit 260 and the input device 270, and the peripheral interface 224.

The display unit 260 displays the state information of the electronic device 200, characters input by the user, moving pictures, still pictures, or the like. For example, the display unit 260 displays information about application programs executed by the processor 222. In another example, the display unit 260 may display the time information of the counterpart electronic device according to control of the GUI program 213.

The input device 270 provides input data generated by the selection of the user to the processor unit 220 through the input/output control unit 250. In this case, the input device 270 includes a keypad including at least one hardware button, a touch pad for detecting touch information, and the like.

In the above-described embodiment, the processor 222 may execute a software component stored in the program storage unit 211 within one module and share time information with the counterpart electronic device.

Figure 3:
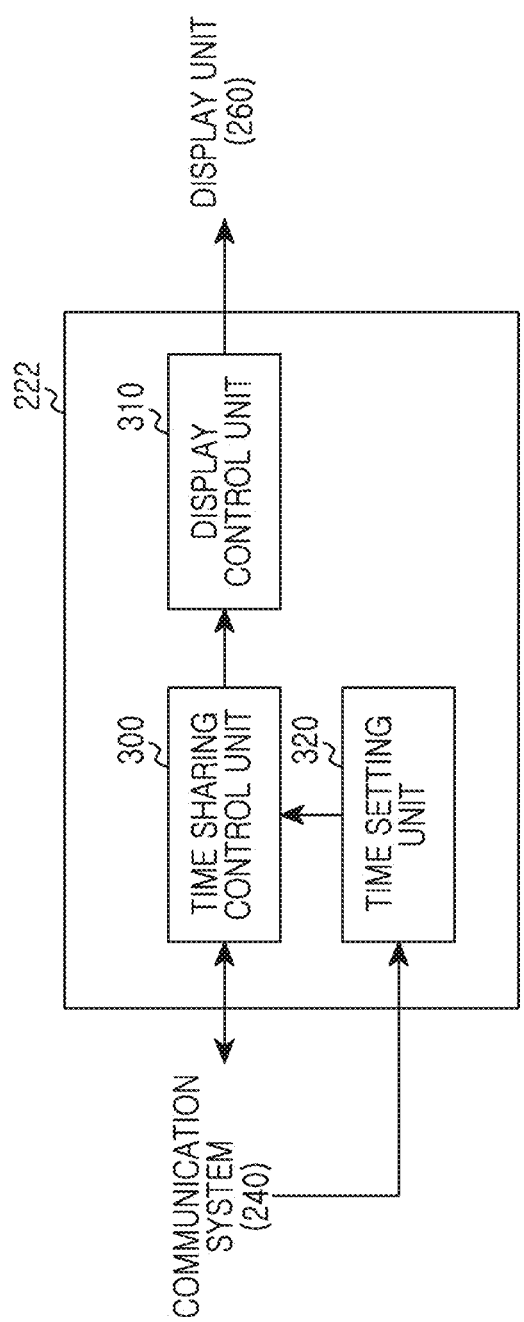
FIG. 3 is a diagram illustrating a block configuration of a processor according to an embodiment of the present disclosure.

As another example, the processor 222 may be configured to include separate modules as components for controlling the sharing of time information with a counterpart electronic device as illustrated in FIG. 3.

FIG. 3 is a diagram illustrating a block configuration of a processor according to an embodiment of the present disclosure.

Referring to FIG. 3, the processor 222 includes a time sharing control unit 300, a display control unit 310, and a time setting unit 320.

The time sharing control unit 300 performs control to share time information with at least one counterpart electronic device. In this case, the time sharing control unit 300 executes at least one time sharing control program 214 stored in the program storage unit 211 to share the time information with the at least one counterpart electronic device.

When a time sharing event occurs, the time sharing control unit 300 may transmit time sharing request information to the at least one counterpart electronic device. In this case, the time sharing control unit 300 may transmit at least one of the time information and authentication information of the electronic device 200 along with the time sharing request information. Thereafter, the time sharing control unit 300 may identify the time information of the at least one counterpart electronic device received through the communication system 240. For example, when receiving the location information of the counterpart electronic device, the time sharing control unit 300 may identify the time information of the counterpart electronic device by using global time information and the location information of the counterpart electronic device stored in the data storage unit 212. In this case, the time sharing control unit 300 may select at least one counterpart electronic device that performs time sharing according to input information provided from the input device 270.

When time sharing request information is received through the communication system 240, the time sharing control unit 300 may determine whether to share time information with the counterpart electronic device according to a time sharing request. For example, the time sharing control unit 300 may display the time sharing request information on the display unit 260. Thereafter, the time sharing control unit 300 may determine whether to share time information with the at least one counterpart electronic device according to input information provided from the input device 270. As another example, the time sharing control unit 300 may determine whether to share time information with the at least one counterpart electronic device based on the authentication information of the counterpart electronic device that requests time sharing.

When the time information is determined to be shared with the counterpart electronic device, the time sharing control unit 300 transmits response information including the time information of the electronic device 200 to the counterpart electronic device through the communication system 240. On the other hand, when the time information is determined not to be shared with the counterpart electronic device, the time sharing control unit 300 performs control to transmit response information indicating that the sharing of time information is not permitted to the counterpart electronic device through the communication system 240.

The display control unit 310 displays a graphic user interface on the display unit 260. The display control unit 310 may execute a GUI program 213 stored in the program storage unit 211 and display the graphic user interface on the display unit 260. For example, the display control unit 310 may display information about an application program that is executed by an application program execution unit (not illustrated) on the display unit 260. As another example, the display control unit 310 may display the time information of a counterpart electronic device that performs time sharing through the time sharing control unit 300 on the display unit 260. In addition, the display unit 310 may display a screen for selection of a counterpart electronic device for time sharing or an information screen related to the time sharing request on the display unit 260. Examples of a screen for selection of a counterpart electronic device for time sharing and an information screen related to the time sharing request are illustrated below in FIG. 12A and FIG. 12B, respectively.

The time setting unit 320 sets the time information of the electronic device 200. In this case, the time setting unit 320 may execute the time setting program 215 stored in the program storage unit 211 and set the time of the electronic device 200. For example, the time setting unit 320 may identify the time information of an area in which the electronic device 200 is located by using Network Identity and Time Zone (NITZ) information received through the communication system 240. As another example, the time setting unit 320 may identify the time information of the area in which the electronic device 200 is located by using a GPS signal.

Figure 4:
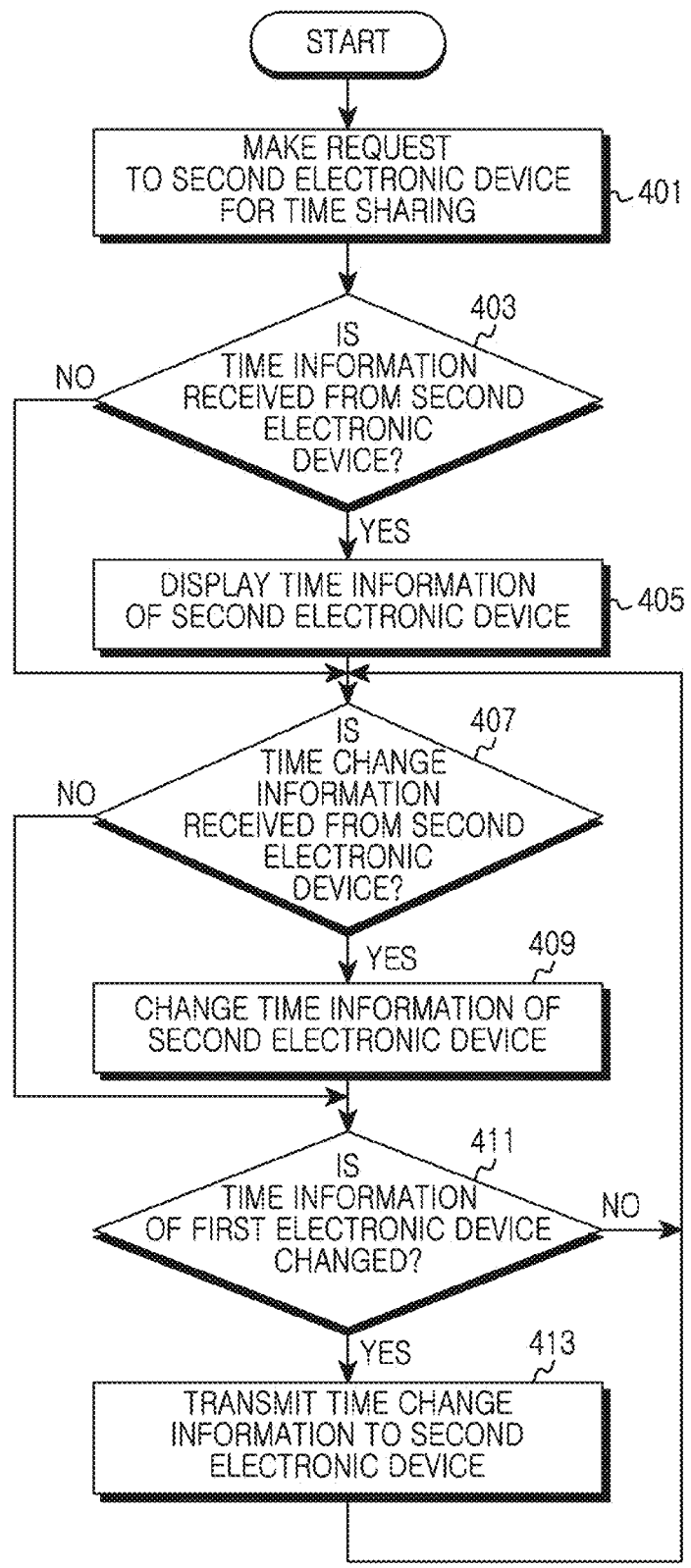
FIG. 4 is a diagram illustrating a process of identifying time information of a counterpart electronic device according to an embodiment of the present disclosure.

FIG. 4 is a diagram illustrating a process of identifying time information of a counterpart electronic device according to an embodiment of the present disclosure. FIGS. 12A, 12B, 12C, and 12D are diagrams illustrating screen configurations for sharing of time information according to an embodiment of the present disclosure. FIGS. 13A, 13B, 13C, 13D, and 13E are diagrams illustrating screen configurations for display of time information according to an embodiment of the present disclosure. FIGS. 14A, 14B, 14C, 14D, and 14E are diagrams illustrating screen configurations for display of time information according to an embodiment of the present disclosure.

Figure 12A:
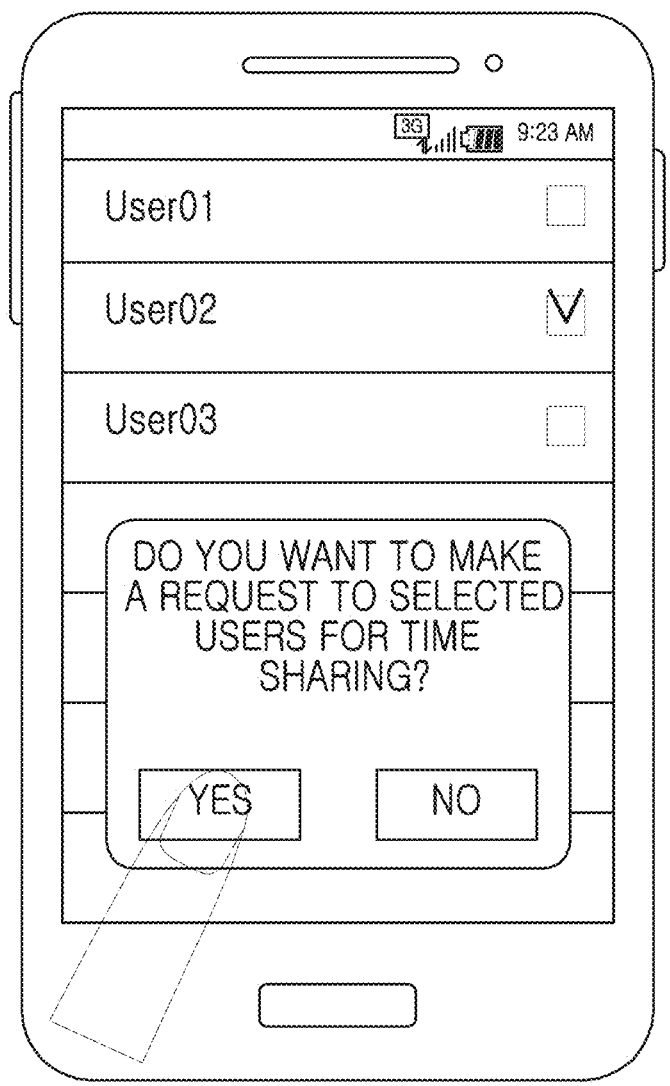
FIGS. 12A, 12B, 12C, and 12D are diagrams illustrating screen configurations for sharing of time information according to an embodiment of the present disclosure.

Referring to FIG. 4, in operation 401, an electronic device makes a request for time sharing to a second electronic device. For example, when a time sharing event occurs, the electronic device may display a list of counterpart electronic devices with which time information may be shared on the display unit 260 as illustrated in FIG. 12A. Thereafter, when a selection of a "yes" menu illustrated in FIG. 12A is detected, the electronic device may perceive that a user has selected at least one counterpart electronic device with which time information is permitted to be shared. Therefore, the electronic device may make a request to a "user 2" that was selected by the user for time sharing. In this case, the electronic device transmits time sharing request information to the second electronic device in the form of a control signal or a message. Herein, the electronic device may detect whether the time sharing event occurs in consideration of at least one of menu selection information, touch information, user gesture information and the movement information of the electronic device. In addition, the list of counterpart electronic devices may include a list of telephone numbers stored in a phonebook. In addition, the second electronic device may include at least one counterpart electronic device selected by the user of the electronic device to share time information.

In operation 403, the electronic device determines whether response information including the time information of the second electronic device is received. In an embodiment, the electronic device determines whether response information having the form of a control signal or message is received. Furthermore, the electronic device may determine that response information including time information is not received when response information is not received for a threshold period of time.

When it is determined in operation 403 that the response information is not received from the second electronic device for the threshold period of time, the electronic device perceives that the second electronic device is located in an area in which the time information is identical to the time information of the electronic device. In operation 407, the electronic device determines whether time change information is received from the second electronic device which performs time sharing. Although not illustrated, when response information indicating that the sharing of time information is not permitted from the second electronic device, the electronic device recognizes that the electronic device is not permitted to share time information with the second electronic device and ends the algorithm.

Figure 12B:
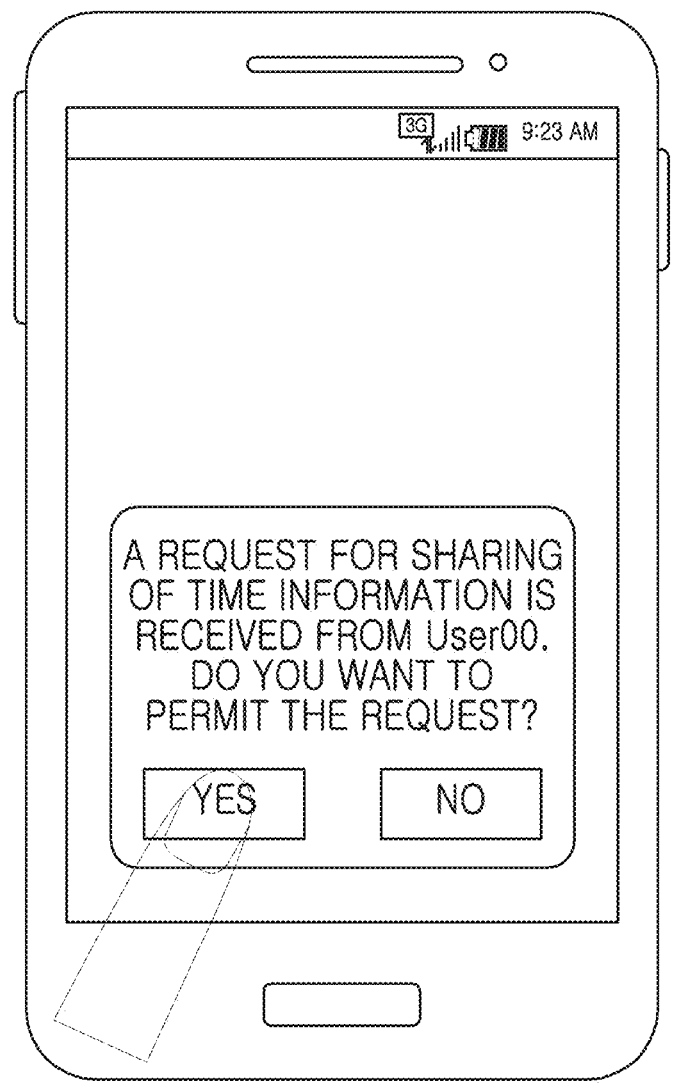
Figure 12C:
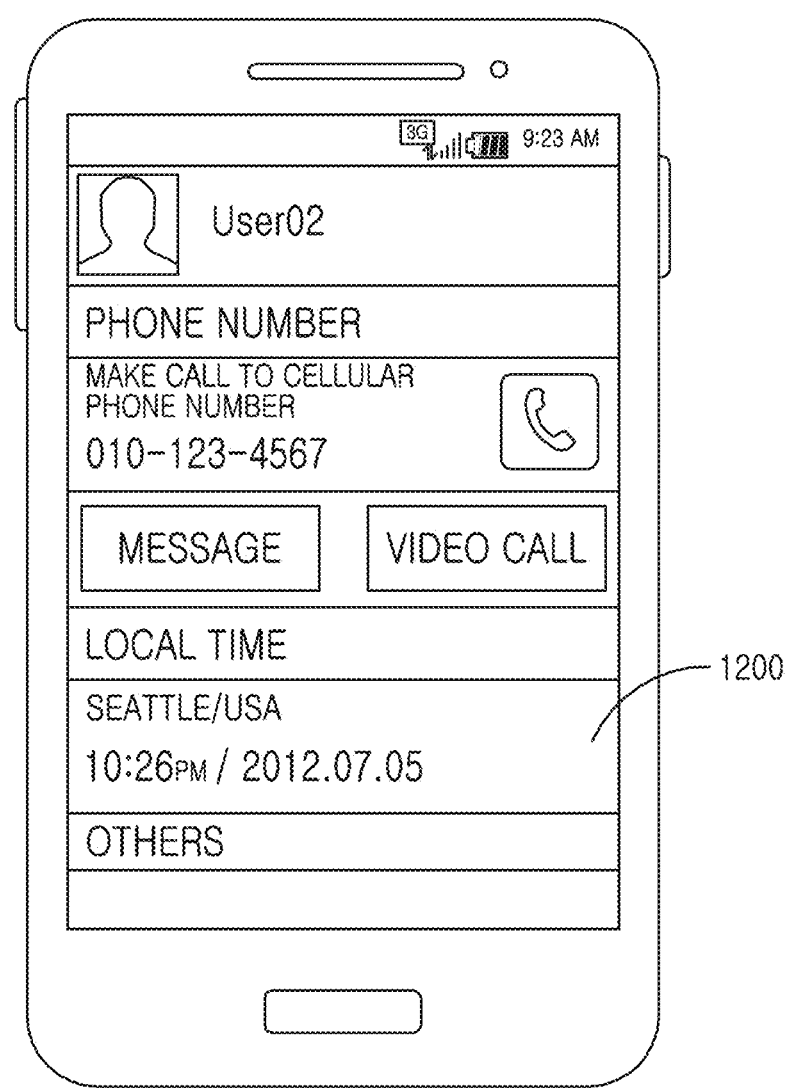
Figure 13A:
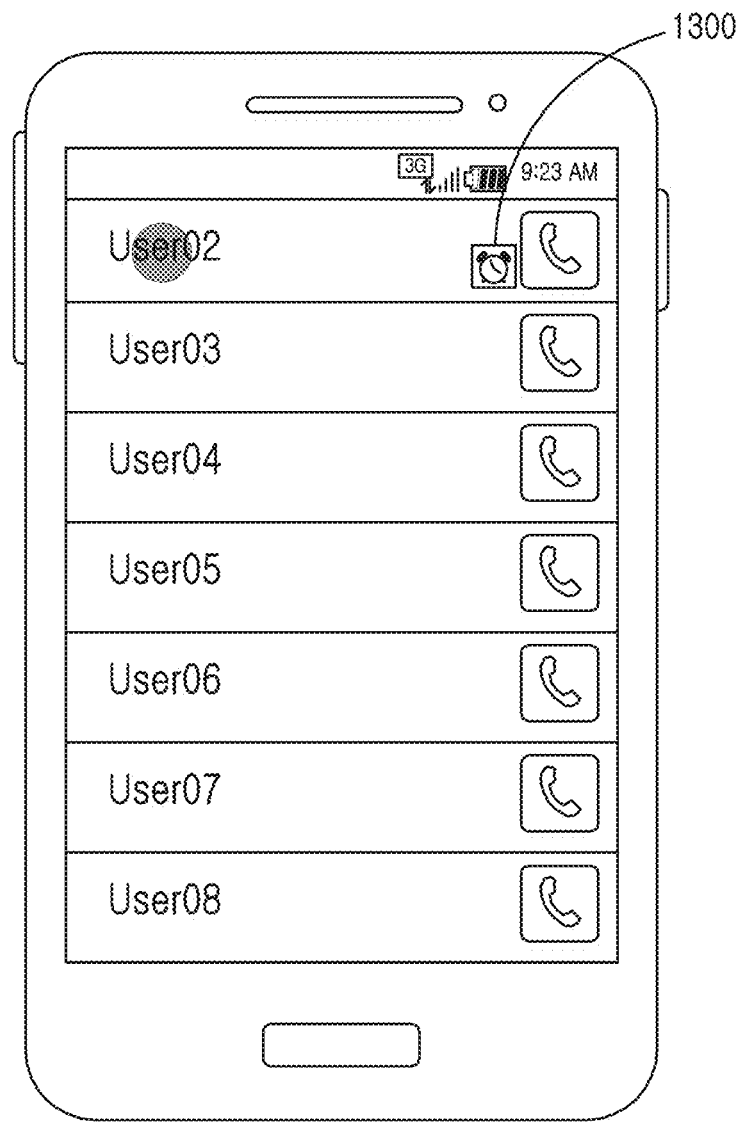
FIGS. 13A, 13B, 13C, 13D, and 13E are diagrams illustrating screen configurations for display of time information according to an embodiment of the present disclosure.
Figure 13B:
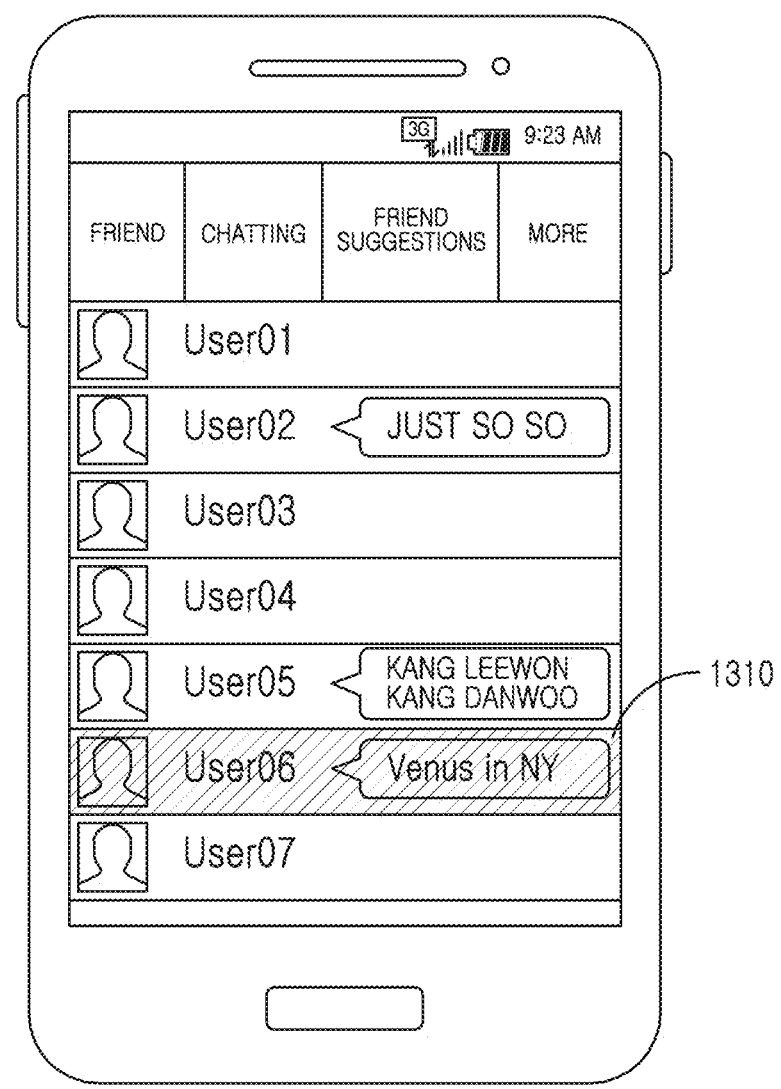
Figure 13C:
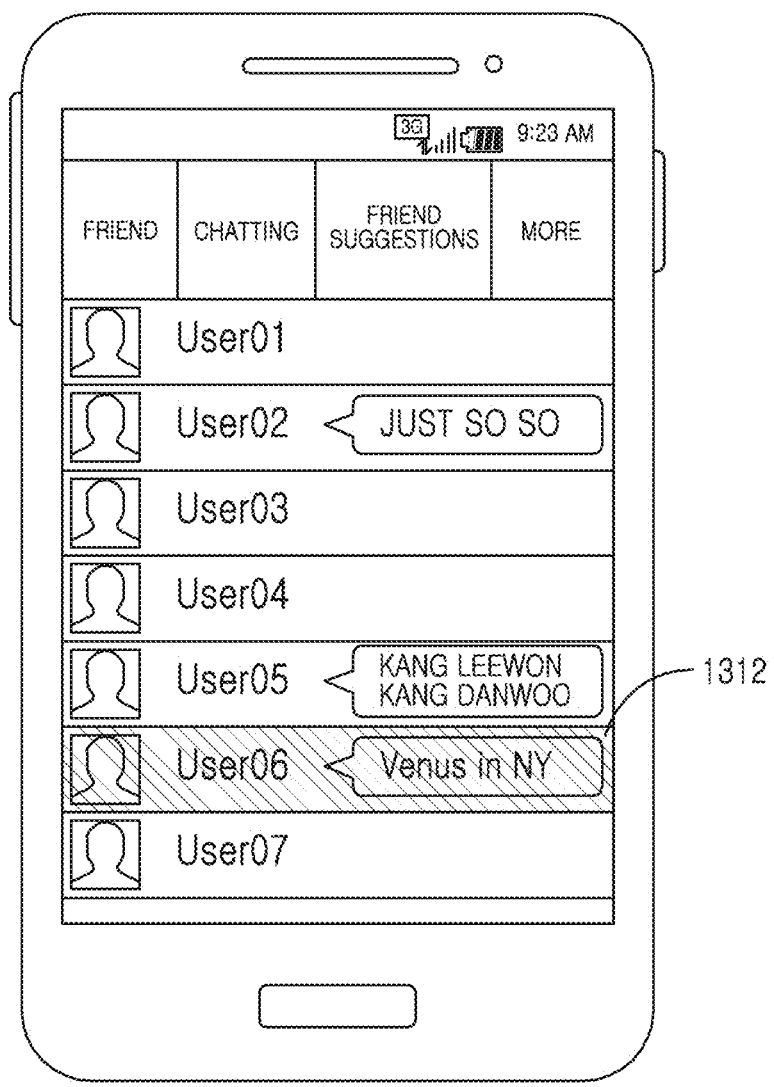
Figure 13D:
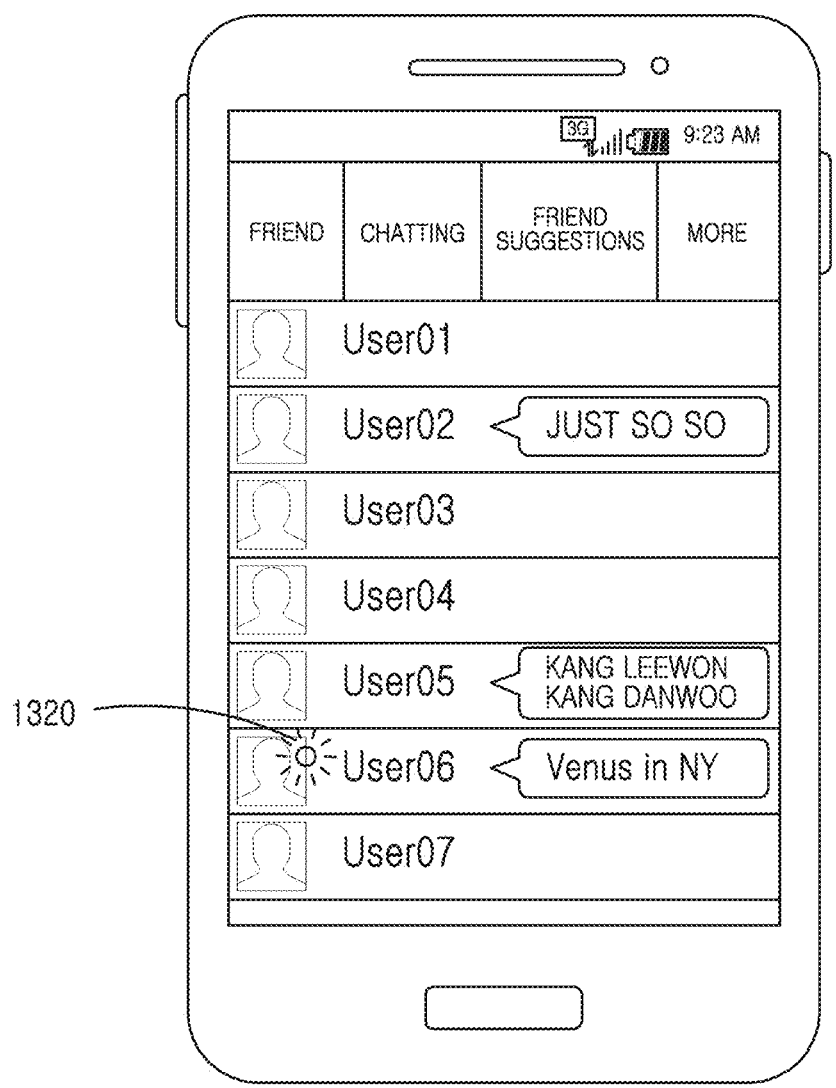
Figure 13E:
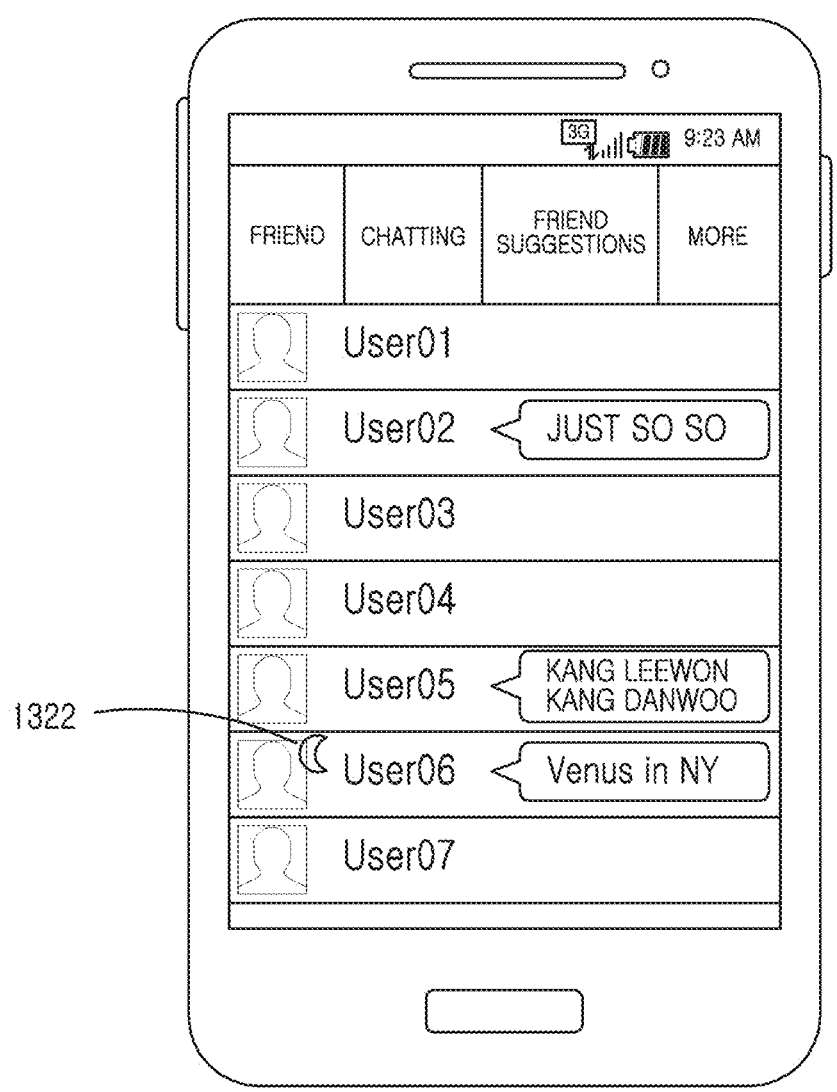

On the other hand, when it is determined in operation 403 that response information including the time information of the second electronic device is received, the electronic device proceeds to operation 405. In operation 405, the electronic device may identify the time information of the second electronic device included in the response information and display the time information on a display unit. When a display event occurs, the electronic device may display the time information of the second electronic device on the display unit. For example, when receiving response information including the time information of the "user 2", the electronic device may add the time information of the "user 2" to a phone book. Thereafter, when the phone book is operated, the electronic device may display the time sharing information 1200 associated with the "user 2" in the phone book information of the "user 2" as illustrated in FIG. 12C. As another example, when the phone book is operated, the electronic device may display a time sharing icon 1300 corresponding to the "user 2" in a phone book list as illustrated in FIG. 13A. As still another example, when receiving response information including the time information of the "user 2", the electronic device may add the time information of the "user 2" to a message application program. Thereafter, when the message application program is executed, the electronic device may display the time sharing information 1310, 1312, 1320 and 1322 associated with a "user 6" in a messenger list as illustrated in FIGS. 13B to 13E. In this case, the electronic device may change and display the background 1310 or 1312 associated with the "user 6" item according to the time information of the "user 6" as illustrated in FIGS. 13B and 13C, and display a different time sharing icon 1320 or 1322 in the "user 6" item as illustrated in FIGS. 13D and 13E.

In operation 407, the electronic device determines whether time change information is received from the second electronic device which performs time sharing.

When the time change information is not received from the second electronic device in operation 407, the electronic device determines whether the time information of the electronic device is changed in operation 411. For example, the electronic device determines whether the electronic device moves to an area using a different standard time.

Figure 12D:

When the time change information is received from the second electronic device in operation 407, the electronic device changes the time information of the second electronic device in consideration of the time change information in operation 409. For example, when the second electronic device moves from Seattle to Texas, the electronic device changes the time information 1210 of the second electronic device according to the time change information provided by the second electronic device as illustrated in FIG. 12D.

In operation 411, the electronic device determines whether the time information of the electronic device is changed. For example, the electronic device determines whether the electronic device moves to an area using a different standard time.

When it is determined in operation 411 the time information of the electronic device is not changed, the electronic device proceeds to operation 407 to determine whether time change information is received from the second electronic device which performs time sharing.

On the other hand, when it is determined in operation 411 that the time information of the electronic device is changed, the electronic device proceeds to operation 413. In operation 413, the electronic device transmits the time change information to the second electronic device which performs time sharing. In this case, the electronic device may transmit the time change information, configured in the form of a control signal or message, to the second electronic device.

When response information has not been received for a reference period of time after making a request to the second electronic device for time sharing, the electronic device may recognize that the second electronic device permits time sharing but is located in an area of which the time information is identical to the time information of the electronic device.

In another embodiment, when response information has not been received for a reference period of time after making a request to the second electronic device for time sharing, the electronic device may recognize that the second electronic device does not permit time sharing.

Figure 14A:
FIGS. 14A, 14B, 14C, 14D, and 14E are diagrams illustrating screen configurations for display of time information according to an embodiment of the present disclosure.
Figure 14B:
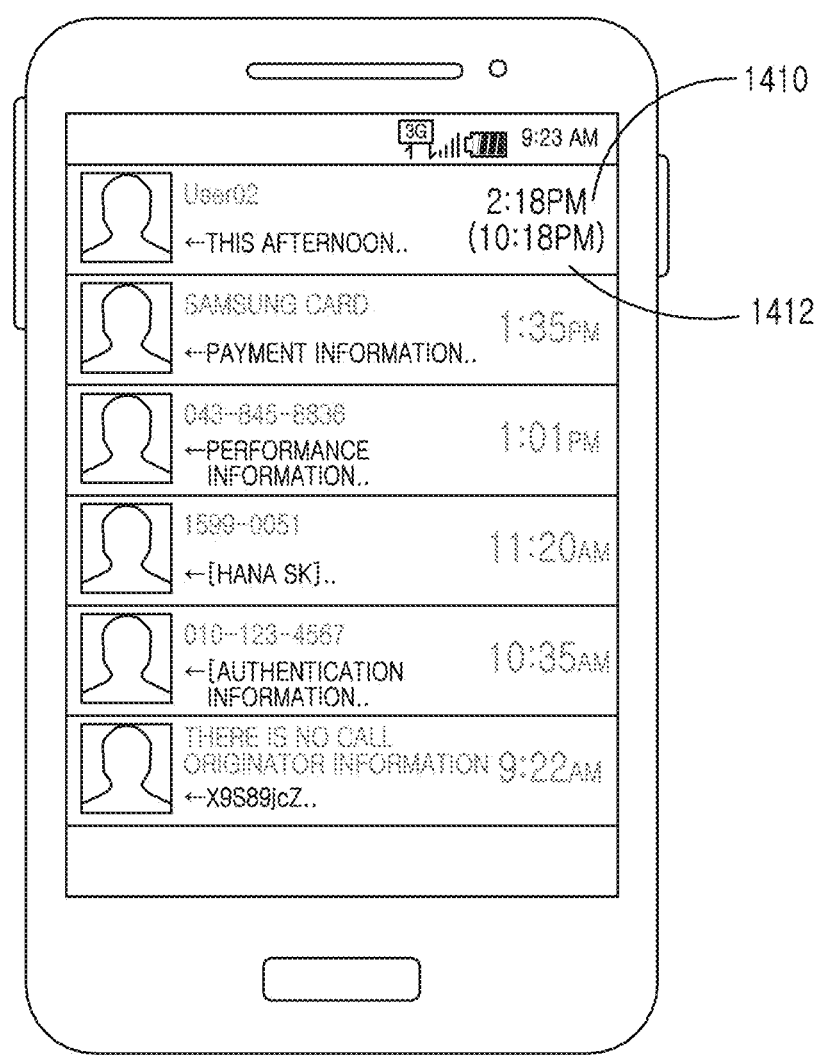
Figure 14C:
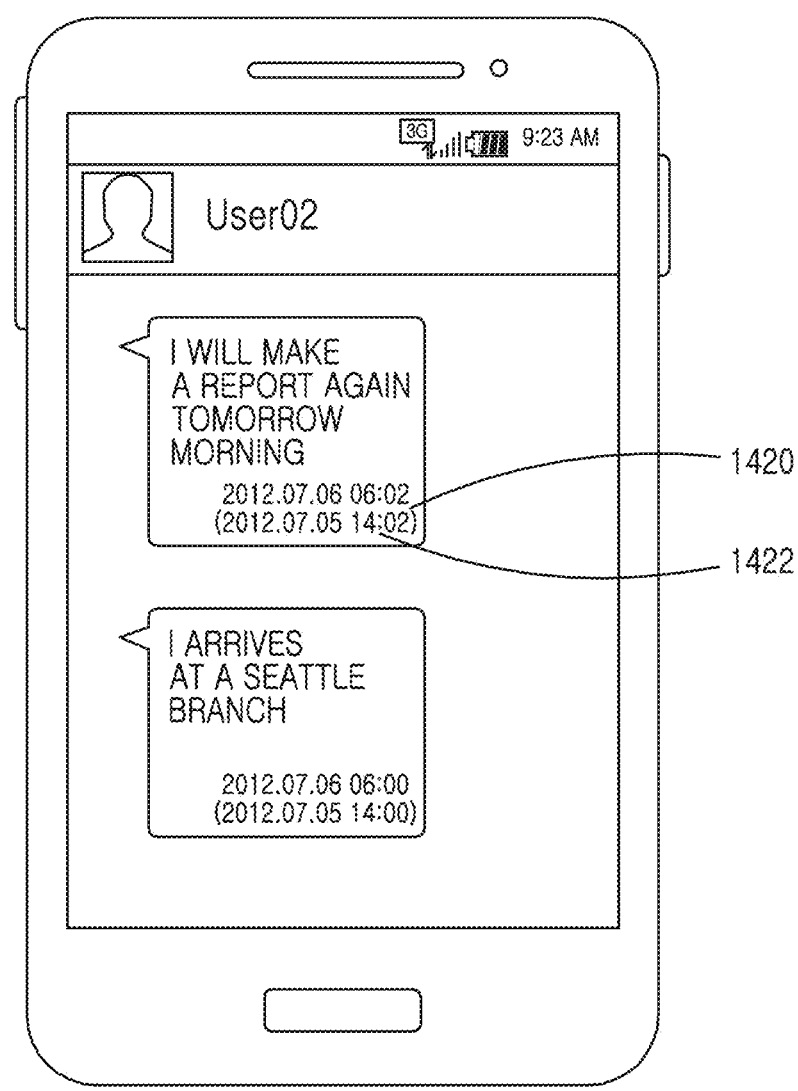
Figure 14D:
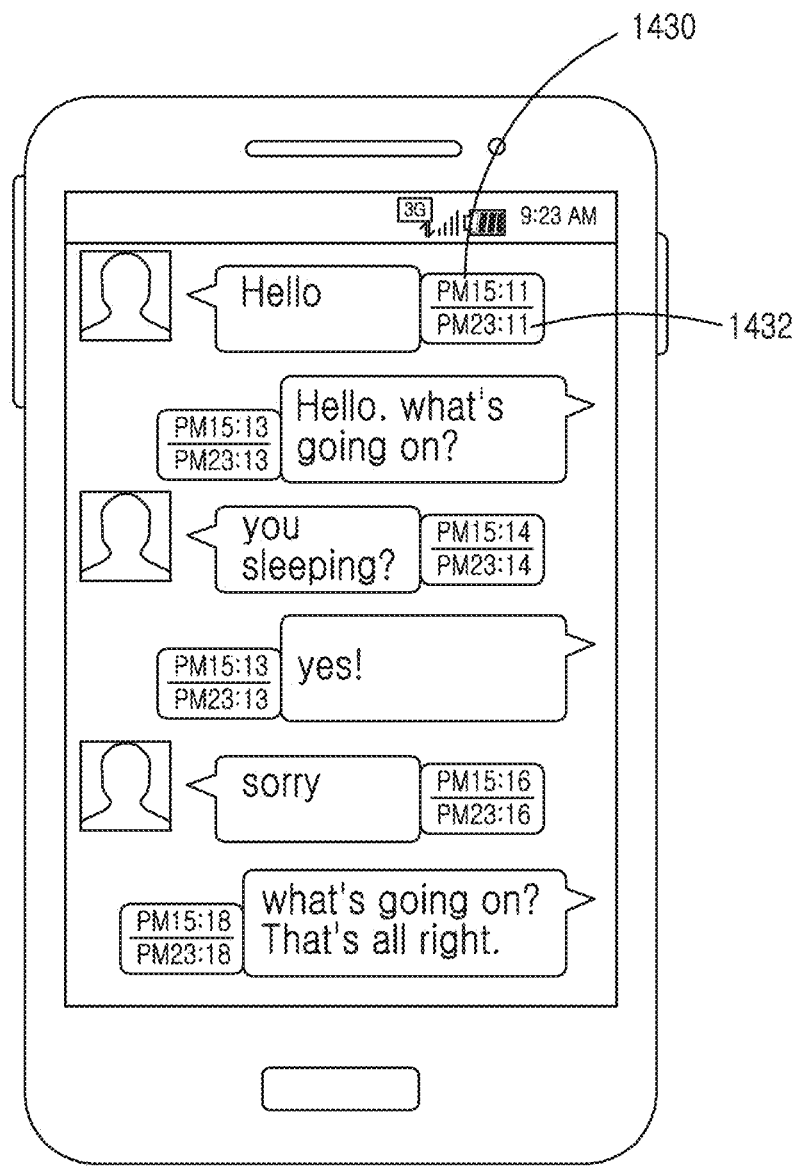
Figure 14E:
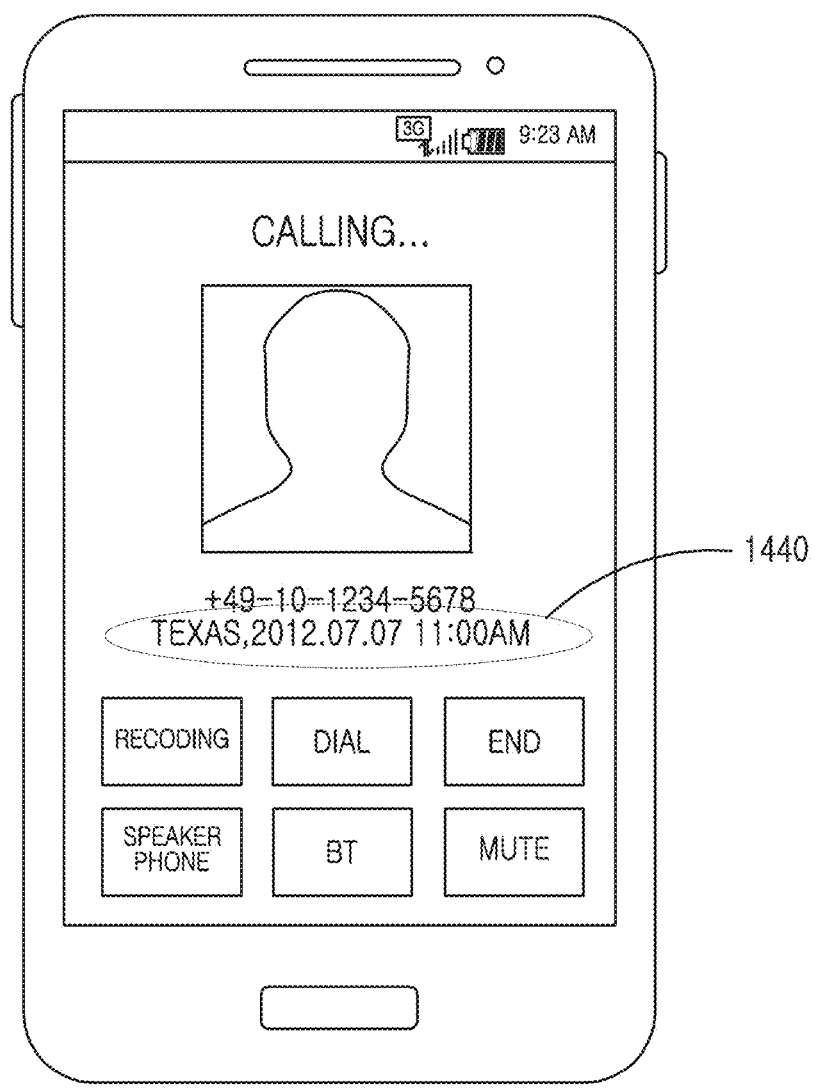

As described above, when the second electronic device permits time sharing, the electronic device may share time information with the second electronic device. In this case, the electronic device may display the time information of the second electronic device in the application program that is being executed. For example, the electronic device may display the time information 1400 of the electronic device and the time information 1402 of the "user 2" in an email received from the "user 2" as illustrated in FIG. 14A. As another example, the electronic device may display the time information 1410 of the electronic device and the time information 1412 of the "user 2" in a "user 2"-related message of a message list as illustrated in FIG. 14B. As another example, the electronic device may display the time information 1420 of the electronic device and the time information 1422 of the "user 2" in a "user 2"-related message as illustrated in FIG. 14C. As still another example, the electronic device may display the time information 1430 of the electronic device and the time information 1432 of the "user 2" in a messenger to chat with the "user 2" as illustrated in FIG. 14D. As still another example, the electronic device may display the time information 1440 of the "user 2" in a screen for voice communication with the "user 2" as illustrated in FIG. 14E.

As described above, the electronic device makes a request to the second electronic device for sharing of time information. In this case, the second electronic device may determine whether to share time information with the electronic device as illustrated in FIG. 5 or FIG. 6.

Figure 5:
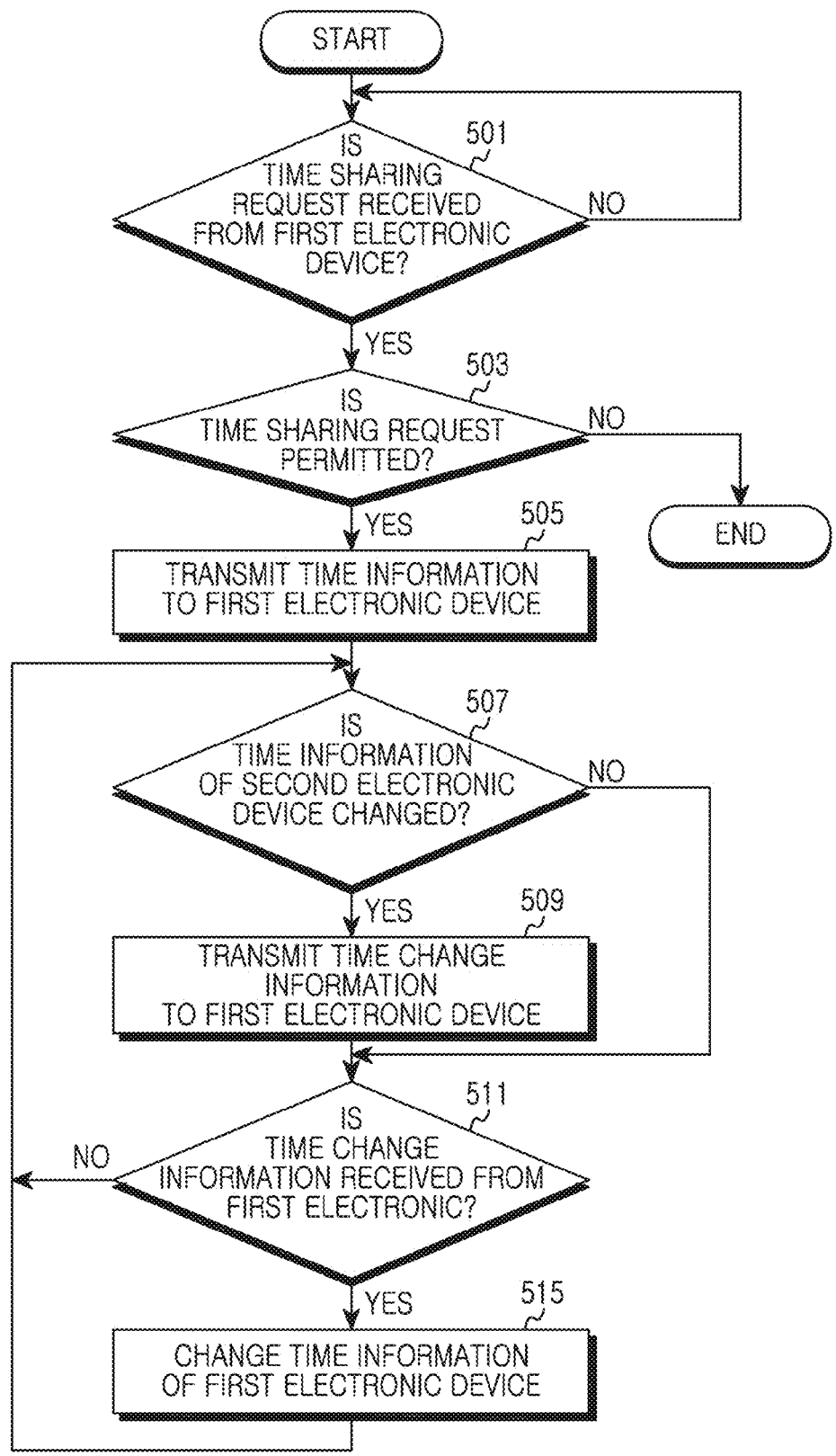
FIG. 5 is a diagram illustrating a process of transmitting time information to a counterpart electronic device according to an embodiment of the present disclosure.
Figure 6:
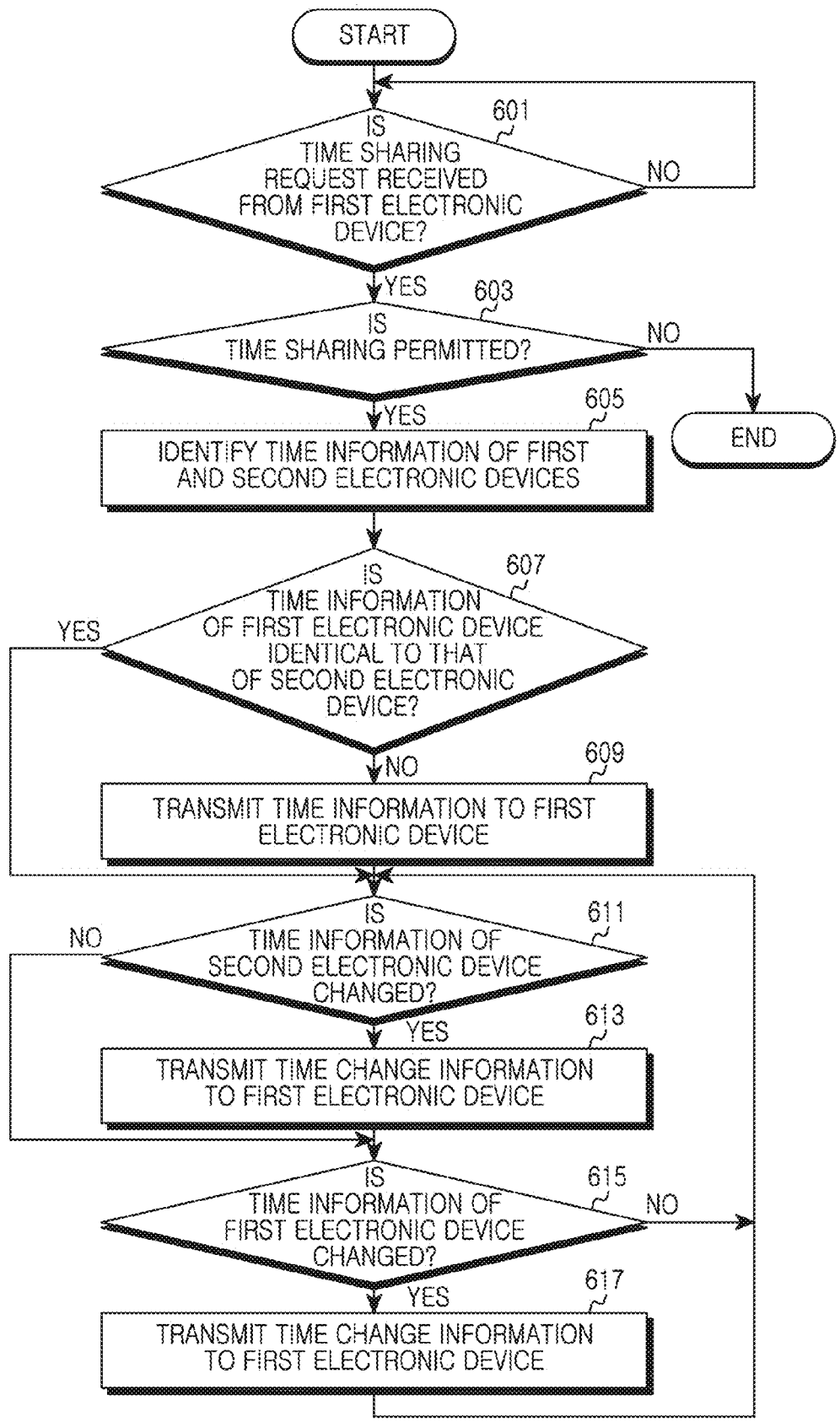
FIG. 6 is a diagram illustrating a process of transmitting time information to a counterpart electronic device according to an embodiment of the present disclosure.

FIG. 5 is a diagram illustrating a process of transmitting time information to a counterpart electronic device according to an embodiment of the present disclosure.

Referring to FIG. 5, in operation 501, an electronic device determines whether time sharing request information is received from a first electronic device. In this case, the electronic device may receive the time sharing request information having the form of a control signal or message.

When receiving the time sharing request information from the first electronic device, the electronic device proceeds to operation 503. In operation 503, the electronic device determines whether to permit the time sharing request of the first electronic device. For example, the electronic device may display the time sharing request information on the display unit 260 as illustrated in FIG. 12B. Thereafter, the electronic device determines whether to share time information with the counterpart electronic device based on whether "YES" or "NO" is selected according to input information provided through the input device 270. As another example, the electronic device may determine whether to share time information with the first electronic device in consideration of the authentication information of the first electronic device included in the time sharing request information.

When not permitting the time sharing request of the first electronic device, the electronic device ends the algorithm. In this case, the electronic device may transmit response information indicating that sharing of time information is not permitted to the first electronic device.

On the other hand, when permitting the time sharing request of the first electronic device, the electronic device proceeds to operation 505. In operation 505, the electronic device transmits response information including the time information of the electronic device to the first electronic device. In this case, the electronic device may transmit the location information of the electronic device using the time information of the electronic device.

In operation 507, the electronic device determines whether the time information of the electronic device is changed. For example, the electronic device determines whether the electronic device moves to an area using a different standard time.

When the time information of the electronic device is not changed, the electronic device proceeds to operation 511. In operation 511, the electronic device determines whether time change information is received from the first electronic device which performs time sharing.

On the other hand, when the time information of the electronic device is changed, the electronic device proceeds to operation 509. In operation 509, the electronic device transmits the time change information to the first electronic device which performs time sharing. In this case, the electronic device transmits the time change information, configured in the form of a control signal or message, to the first electronic device.

In operation 511, the electronic device determines whether time change information is received from first electronic device which performs time sharing.

When the time change information is not received from the first electronic device, the electronic device determines whether the time information of the electronic device is changed in operation 507.

When the time change information is received from the first electronic device, the electronic device proceeds to operation 515 and changes the time information of the first electronic device in consideration of the time change information. For example, when the first electronic device moves from Seattle to Texas, the electronic device changes the time information 1210 of the first electronic device according to the time change information provided by the first electronic device as illustrated in FIG. 12D.

As described above, when permitting the time sharing request of the first electronic device, the electronic device transmits time information with the first electronic device. In this case, the electronic device identifies the time information of the first electronic device included in the time sharing request information provided from the first electronic device. Thereafter, when a display event occurs, the electronic device may display the time information of the first electronic device on a display unit.

FIG. 6 is a diagram illustrates a process of transmitting time information to a counterpart electronic device according to an embodiment of the present disclosure.

Referring to FIG. 6, in operation 601, an electronic device determines whether time sharing request information is received from a first electronic device. In this case, the electronic device may receive the time sharing request information having the form of a control signal or message.

When receiving the time sharing request information from the first electronic device, the electronic device proceeds to operation 603 and determines whether to permit the time sharing request of the first electronic device. For example, the electronic device may display the time sharing request information on the display unit 260 as illustrated in FIG. 12B. Thereafter, the electronic device may determine whether to share time information with the counterpart electronic device based on whether "YES" or "NO" is selected according to input information provided through the input device 270. As another example, the electronic device may determine whether to share time information with the first electronic device in consideration of the authentication information of the first electronic device included in the time sharing request information.

When not permitting the time sharing request of the first electronic device, the electronic device ends the algorithm. In this case, the electronic device may transmit response information indicating that sharing of time information is not permitted to the first electronic device.

On the other hand, when permitting the time sharing request of the first electronic device, the electronic device proceeds to operation 605 and identifies the time information of the electronic device and the first electronic device. For example, the electronic device may identify the time information of the electronic device in consideration of the standard time of an area in which the electronic device is located. In addition, the electronic device may identify the time information of the first electronic device included in the time sharing request information provided from the first electronic device.

In operation 607, the electronic device determines whether the time information of the electronic device is identical to that of the first electronic device.

When the time information of the electronic device is identical to that of the first electronic device, the electronic device determines whether the time information of the electronic device is changed in operation 611. For example, the electronic device determines whether the electronic device moves to an area using a different standard time.

On the other hand, when the time information of the electronic device is not identical to that of the first electronic device, the electronic device proceeds to operation 609. In operation 609, the electronic device transmits response information including the time information of the electronic device to the first electronic device. In this case, the electronic device may transmit the location information of the electronic device using the time information of the electronic device.

In operation 611, the electronic device determines whether the time information of the electronic device is changed. For example, the electronic device determines whether the electronic device moves to an area using a different standard time.

When the time information of the electronic device is not changed, the electronic device proceeds to operation 615 and determines whether time change information is received from the first electronic device which performs time sharing.

On the other hand, when the time information of the electronic device is changed, the electronic device proceeds to operation 613 and transmits the time change information to the first electronic device which performs time sharing. In this case, the electronic device transmits the time change information, configured in the form of a control signal or message, to the first electronic device.

In operation 615, the electronic device determines whether time change information is received from first electronic device which performs time sharing.

When the time change information is not received from the first electronic device, the electronic device determines whether the time information of the electronic device is changed in operation 611.

When the time change information is received from the first electronic device, the electronic device proceeds to operation 617 and changes the time information of the first electronic device in consideration of the time change information. For example, when the first electronic device moves from Seattle to Texas, the electronic device changes the time information 1210 of the first electronic device according to the time change information provided by the first electronic device as illustrated in FIG. 12D.

As described above, when permitting the time sharing request of the first electronic device, the electronic device may transmit time information with the first electronic device. When a display event occurs, the electronic device may display the time information of the first electronic device on the display unit.

In the above-described embodiment, the first electronic device and the second electronic device transmit time information and time change information to each other, thereby sharing time information with each other.

Figure 7:
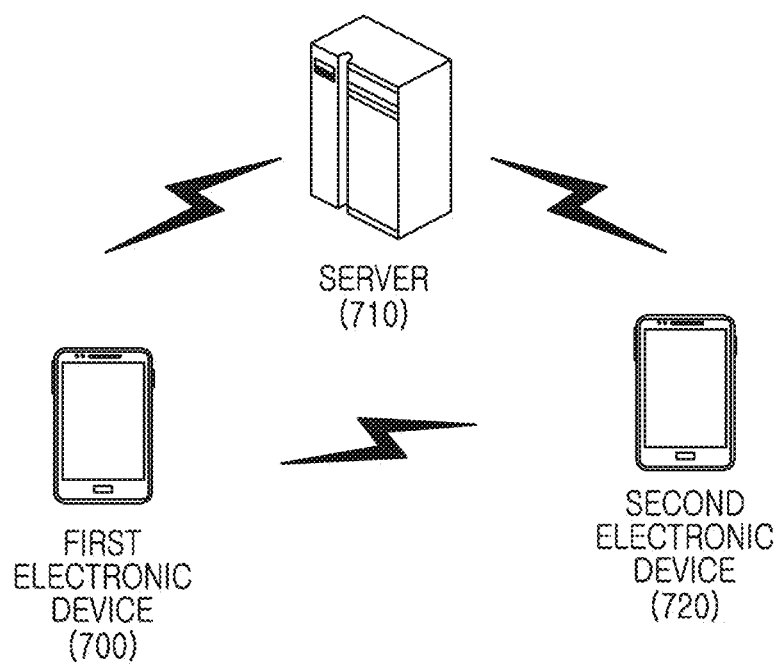
FIG. 7 is a diagram illustrating a configuration for enabling electronic devices to share time information using a server according to an embodiment of the present disclosure.

In another embodiment, the first electronic device and the second electronic device may share time information with each other using a server as illustrated in FIG. 7.

FIG. 7 is a diagram illustrating a configuration for enabling electronic devices to share time information using a server according to an embodiment of the present disclosure.

Referring to FIG. 7, when the user of a first electronic device 700 wants to share time information with a second electronic device 720, the first electronic device 700 may make a request to the second electronic device 720 for time sharing. For example, the first electronic device 700 may transmit a control signal for request of time sharing to the second electronic device 720. As another example, the first electronic device 700 may transmit a message including time sharing request information to the second electronic device 720. When making the request for time sharing, the first electronic device 700 may transmit at least one of the time information and authentication information of the first electronic device 700 together with the time sharing request information to the second electronic device 720. In this case, the second electronic device 200 refers to at least one counterpart electronic device selected by the user of the first electronic device 700 to share time information.

When receiving the time sharing request information of the first electronic device 700, the second electronic device 720 determines whether to share time information with the first electronic device 700. When it is determined to share time information with the first electronic device 700, the second electronic device 720 transmits the time information of the second electronic device 720 to the first electronic device 700. In this case, the second electronic device 720 may identify the time information of the first electronic device 700 included in the time sharing request information and display the time information so as to allow a user to view it.

After making the request for time sharing, the first electronic device 700 displays the time information provided by the second electronic device 720 on the display unit so as to allow the user to view it.

Thereafter, when the time information (standard time) of the first electronic device 700 is changed, the first electronic device 700 transmits time change information to a server 710. In addition, when the time information (standard time) of the second electronic device 720 is changed, the second electronic device 720 transmits time change information to the server 710. Herein, the server 710 includes a cloud server.

When receiving the time change information, the server 710 transmits the time change information to an electronic device set as a receiver of the time change information. For example, the first electronic device 700 and the second electronic device 720 may register the time information of respective electronic devices 700 and 720 and a list of electronic devices which perform time sharing in the server 710. When receiving the time change information from the first electronic device 700, the server 710 may update the time information of the first electronic device 700 registered in the server 710. Thereafter, the server 710 may transmit the time change information of the first electronic device 700 to counterpart electronic devices which share time information with the first electronic device 700. In this case, the server 710 may transmit a PUSH message including the time change information to the counterpart electronic devices which share time information with the first electronic device 700.

When receiving the time change information from the second electronic device 720, the server 710 may update the time information of the second electronic device 720 registered in the server 710. Thereafter, the server 710 may transmit the time change information of the second electronic device 720 to counterpart electronic devices which share time information with the second electronic device 720. In this case, the server 710 may transmit a PUSH message including the time change information to the counterpart electronic devices which share time information with the second electronic device 720.

Therefore, the first electronic device 700 and the second electronic device 720 may update the time information associated with the first electronic device 100 of the counterpart electronic devices 700 and 720 according to the time change information provided from the server 710.

Figure 8:
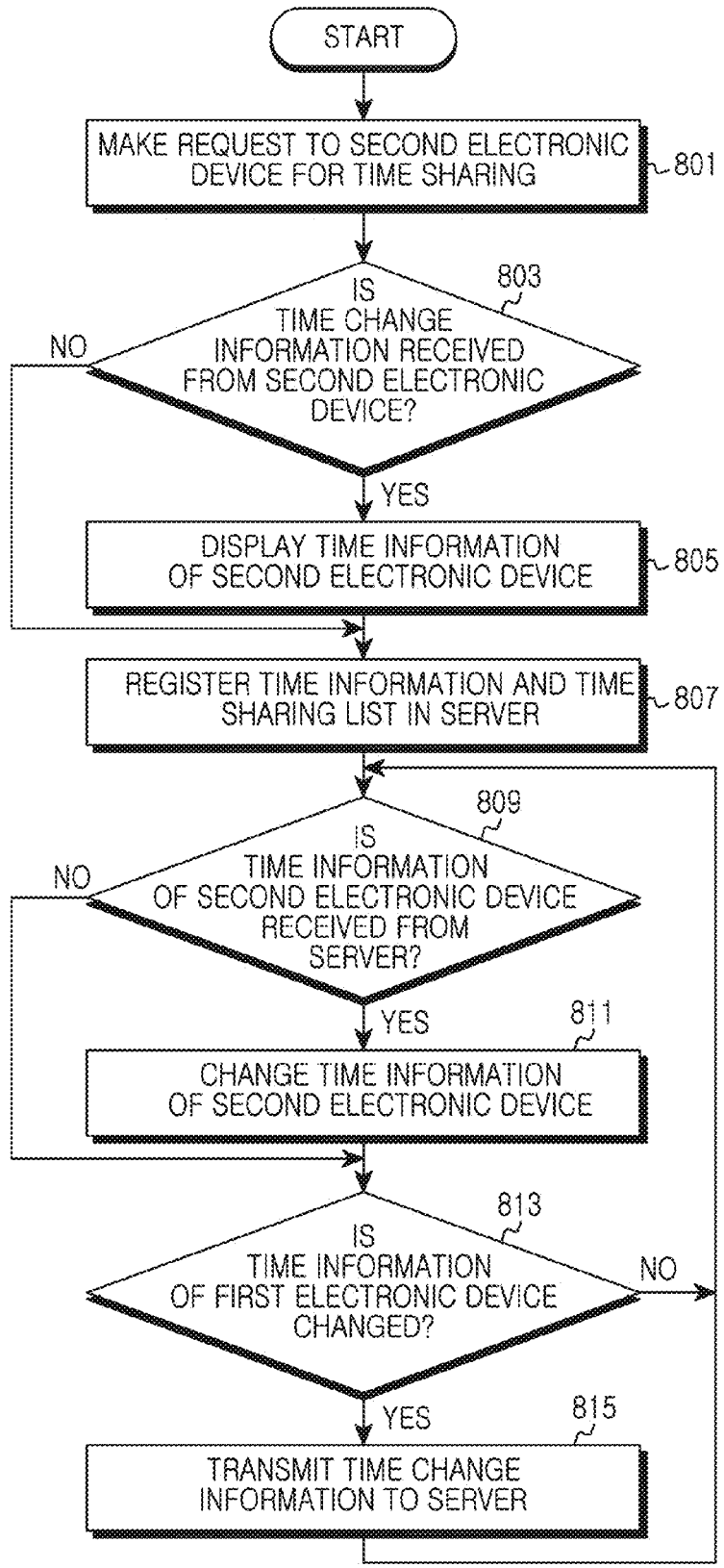
FIG. 8 is a diagram illustrating a process of identifying time information of a counterpart electronic device using a server according to an embodiment of the present disclosure.

FIG. 8 illustrates a process of identifying the time information of a counterpart electronic device using a server according to an embodiment of the present disclosure.

Referring to FIG. 8, in operation 801, an electronic device makes a request to a second electronic device for time sharing. For example, when a time sharing event occurs, the electronic device may display a list of counterpart electronic devices with which time information may be shared on the display unit 260 as illustrated in FIG. 12A. Thereafter, when a selection of a "yes" menu illustrated in FIG. 12A is detected, the electronic device may perceive that a user has selected at least one counterpart electronic device with which time information is permitted to be shared. Therefore, the electronic device may make a request to a "user 2" selected by the user for time sharing. In this case, the electronic device may transmit time sharing request information to the second electronic device in the form of a control signal or message. Herein, the electronic device may detect whether the time sharing event occurs in consideration of at least one of menu selection information, touch information, user gesture information and the movement information of the electronic device. In addition, the list of counterpart electronic devices may include a list of telephone numbers stored in a phonebook. In addition, the second electronic device may be at least one counterpart electronic device selected by the user of the electronic device to share time information.

In operation 803, the electronic device determines whether response information including the time information of the second electronic device is received. In this case, the electronic device may determine whether response information having the form of a control signal or message is received.

When the response information is not received from the second electronic device for a reference period of time, the electronic device may recognize that the second electronic device is located in an area of which the time information is identical to the time information of the electronic device. Accordingly, in operation 807, the electronic device registers the time sharing information of the electronic device in a server. Herein, the time sharing information may include the time information of the electronic device and information about at least one counterpart electronic device which shares time information with the electronic device. Although not illustrated, when response information indicating that the sharing of time information is not permitted from the second electronic device, the electronic device recognizes that the electronic device is not permitted to share time information with the second electronic device and ends the algorithm.

On the other hand, when receiving response information including the time information of the second electronic device, the electronic device proceeds to operation 805 and identifies and stores the time information of the second electronic device included in the response information. Thereafter, when a display event occurs, the electronic device displays the time information of the second electronic device on a display unit. For example, when receiving response information including the time information of the "user 2", the electronic device may identify and store the time information of the "user 2" in the response information. Thereafter, the electronic device may display time sharing information associated with the "user 2" in a list of application programs including the "user 2". For example, when the phone book is operated, the electronic device displays a time sharing icon 1300 in the "user 2" of a phone book list as illustrated in FIG. 13A. As another example, when a message application program is executed, the electronic device may display the time sharing information 1310, 1312, 1320 and 1322 associated with a "user 6" in a messenger list as illustrated in FIGS. 13B to 13E. In this case, the electronic device may change and display the background 1310 or 1312 of the "user 6" item according to the time information of the "user 6" as illustrated in FIGS. 13B and 13C, and display a different time sharing icon 1320 or 1322 in the "user 6" item as illustrated in FIGS. 13D and 13E.

After displaying the time information of the second electronic device, the electronic device proceeds to operation 807 and registers the time information of the electronic device and a time sharing list in the server. Herein, the time sharing list may include information about at least one counterpart electronic device which shares time information with the electronic device.

In operation 809, the electronic device determines whether time change information is received from the server.

When the time change information is not received from the server, the electronic device determines whether the time information of the electronic device is changed in operation 813. For example, the electronic device determines whether the electronic device moves to an area using a different standard time.

On the other hand, when receiving the time change information from the server, the electronic device proceeds to operation 811 and changes the time information of the counterpart electronic device of which the time information has been changed according to the time change information provided from the server. For example, when receiving the time change information of the second electronic device from the server, the electronic device may change the time information 1210 of the second electronic device to "Texas" as illustrated in FIG. 12D according to the time change information provided from the server.

In operation 813, the electronic device determines whether the time information of the electronic device is changed. For example, the electronic device determines whether the electronic device moves to an area using a different standard time.

When the time information of the electronic device is not changed, the electronic device determines whether time change information is received from the server in operation 809.

On the other hand, when the time information of the electronic device is changed, the electronic device proceeds to operation 815 and transmits the time change information to the server. In this case, the electronic device may transmit the time change information, configured in the form of a control signal or message, to the server.

When response information has not been received for a reference period of time after making a request to the second electronic device for time sharing, the electronic device recognizes that the second electronic device permits time sharing but is located in an area of which the time information is identical to the time information of the electronic device.

In another embodiment, when response information has not been received for a reference period of time after making a request to the second electronic device for time sharing, the electronic device may recognize that the second electronic device does not permit time sharing.

As described above, when the second electronic device permits time sharing, the electronic device may share time information with the second electronic device. In this case, the electronic device may display the time information of the second electronic device in the application program that is being executed. For example, the electronic device may display the time information 1400 of the electronic device and the time information 1402 of the "user 2" in an email received from the "user 2" as illustrated in FIG. 14A. As another example, the electronic device may display the time information 1410 of the electronic device and the time information 1412 of the "user 2" in a "user 2"-related message of a message list as illustrated in FIG. 14B. As another example, the electronic device may display the time information 1420 of the electronic device and the time information 1422 of the "user 2" in a "user 2"-related message as illustrated in FIG. 14C. As still another example, the electronic device may display the time information 1430 of the electronic device and the time information 1432 of the "user 2" in a messenger to chat with the "user 2" as illustrated in FIG. 14D. As still another example, the electronic device may display the time information 1440 of the "user 2" in a screen for voice communication with the "user 2" as illustrated in FIG. 14E.

As described above, the electronic device may make a request to the second electronic device for sharing of time information. In this case, the second electronic device may determine whether to share time information with the electronic device as illustrated in FIG. 9 or FIG. 10.

Figure 9:
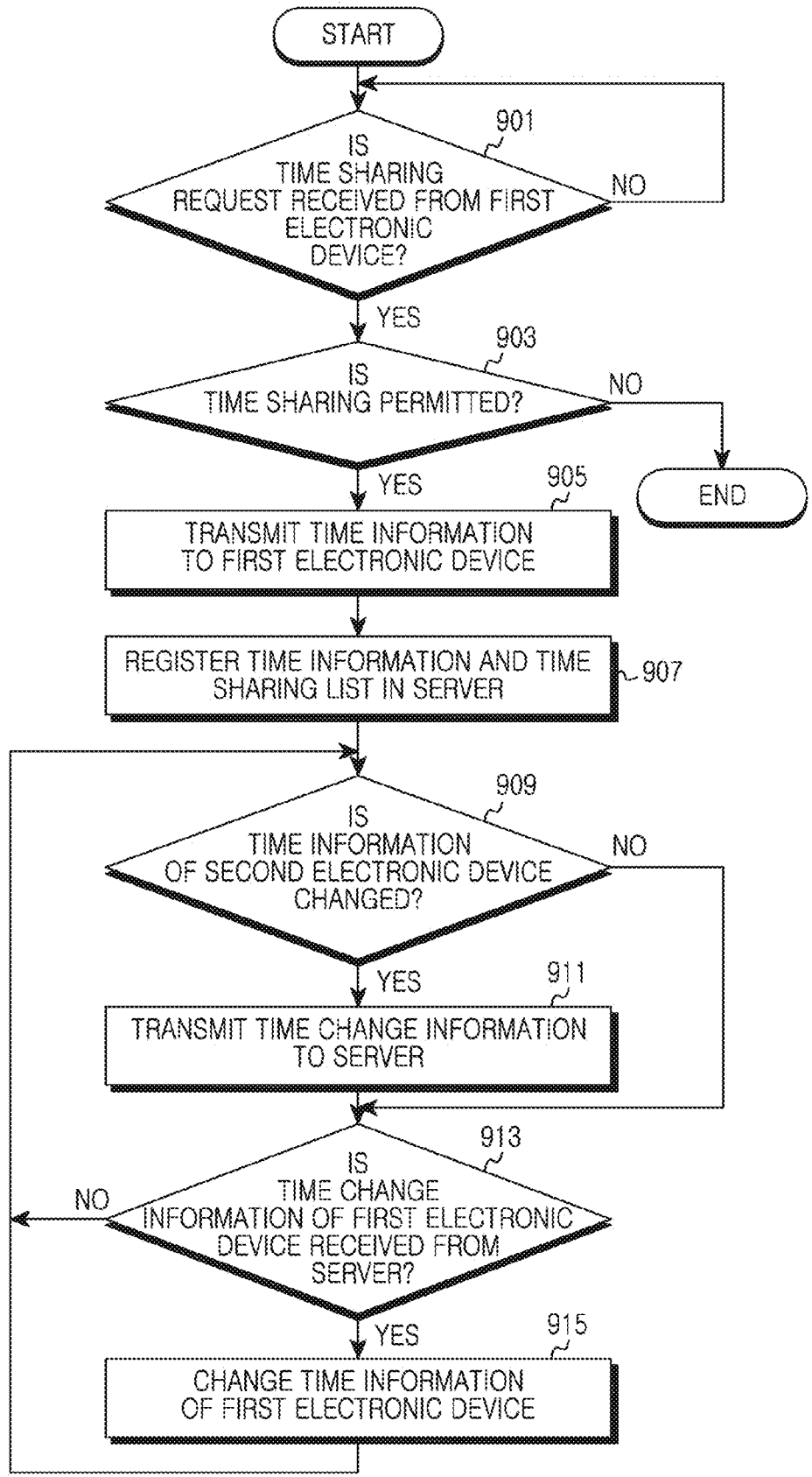
FIG. 9 is a diagram illustrating a process of transmitting time information to a counterpart electronic device using a server according to an embodiment of the present disclosure.
Figure 10:
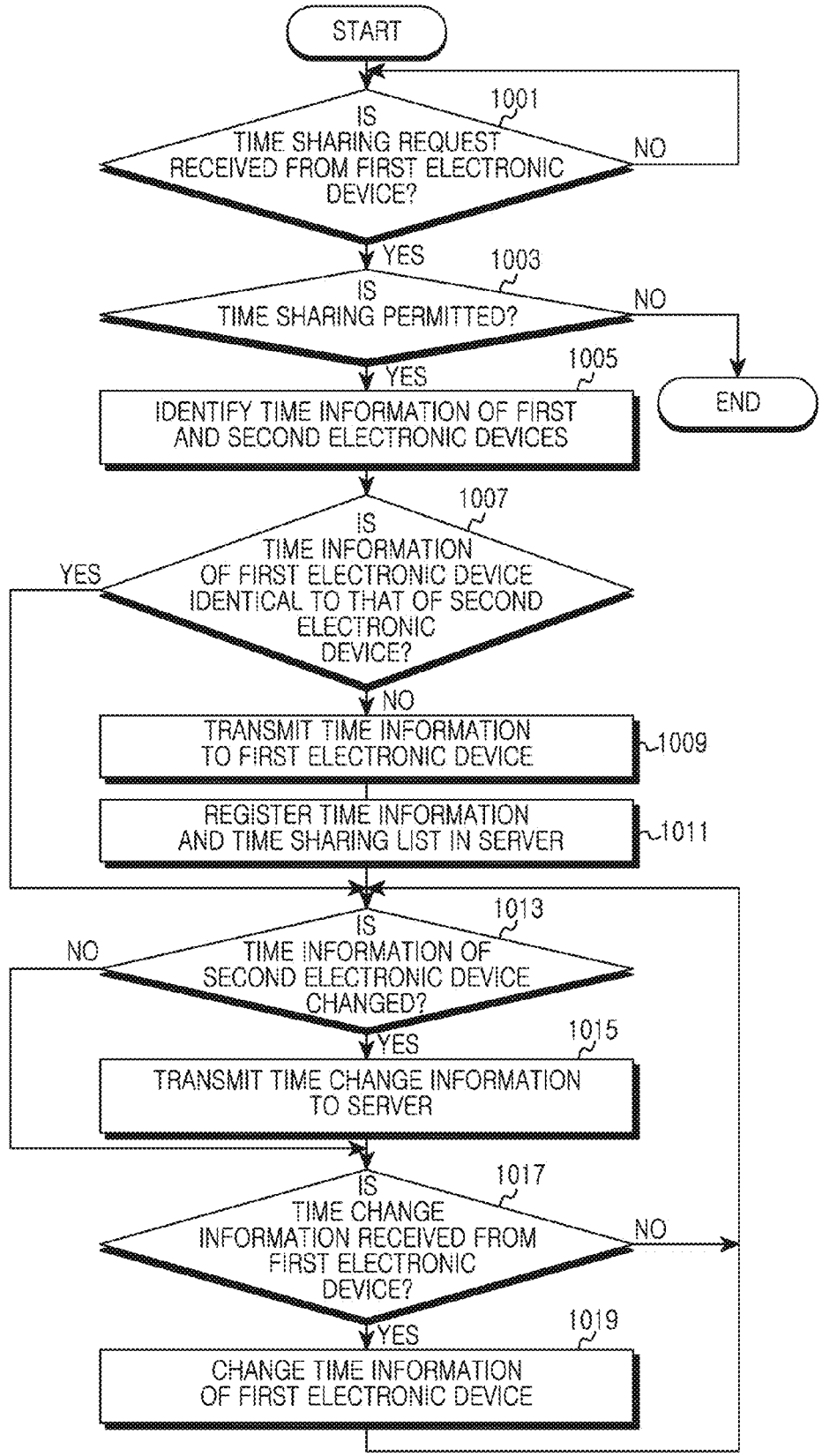
FIG. 10 is a diagram illustrating a process of transmitting time information to a counterpart electronic device using a server according to an embodiment of the present disclosure.

FIG. 9 is a diagram illustrating a process of transmitting time information to a counterpart electronic device using a server according to an embodiment of the present disclosure.

Referring to FIG. 9, in operation 901, an electronic device determines whether time sharing request information is received from a first electronic device. In this case, the electronic device may receive the time sharing request information having the form of a control signal or message.

When receiving the time sharing request information from the first electronic device, the electronic device determines whether to permit the time sharing request of the first electronic device in operation 903. For example, the electronic device may display the time sharing request information on the display unit 260 as illustrated in FIG. 12B. Thereafter, the electronic device determines whether to share time information with the counterpart electronic device based on whether "YES" or "NO" is selected according to input information provided through the input device 270. As another example, the electronic device may determine whether to share time information with the first electronic device in consideration of the authentication information of the first electronic device included in the time sharing request information.

When not permitting the time sharing request of the first electronic device, the electronic device ends the algorithm. In this case, the electronic device may transmit response information indicating that sharing of time information is not permitted to the first electronic device.

On the other hand, when permitting the time sharing request of the first electronic device, the electronic device proceeds to operation 905. In operation 905, the electronic device transmits response information including the time information of the electronic device to the first electronic device. In this case, the electronic device may transmit the location information of the electronic device using the time information of the electronic device.

After transmitting the response information including the time information to the first electronic device, the electronic device registers the time sharing information of the electronic device in a server in operation 907. Herein, the time sharing information includes the time information of the electronic device and information about at least one counterpart electronic device which shares time information with the electronic device.

In operation 909, the electronic device determines whether the time information of the electronic device is changed. For example, the electronic device determines whether the electronic device moves to an area using a different standard time.

When the time information of the electronic device is not changed, the electronic device determines whether time change information is received from the server in operation 913.

On the other hand, when the time information of the electronic device is changed, the electronic device proceeds to operation 911 and transmits the time change information to the server. In this case, the electronic device transmits the time change information, configured in the form of a control signal or message, to the server.

In operation 913, the electronic device determines whether time change information is received from the server.

When the time change information is not received from the server, the electronic device determines whether the time information of the electronic device is changed in operation 909.

On the other hand, when receiving the time change information from the server, the electronic device proceeds to operation 915 and changes the time information of the counterpart electronic device of which the time information has been changed according to the time change information provided from the server. For example, when receiving the time change information of the first electronic device from the server, the electronic device changes the time information 1210 of the first electronic device to "Texas" as illustrated in FIG. 12D according to the time change information provided from the server.

As described above, when permitting the time sharing request of the first electronic device, the electronic device may transmit time information with the first electronic device. In this case, the electronic device may identify the time information of the first electronic device included in the time sharing request information provided from the first electronic device. Thereafter, when a display event occurs, the electronic device may display the time information of the first electronic device on a display unit.

FIG. 10 is a diagram illustrating a process of transmitting time information to a counterpart electronic device using a server according to an embodiment of the present disclosure.

Referring to FIG. 10, in operation 1001, an electronic device determines whether time sharing request information is received from a first electronic device. In this case, the electronic device may receive the time sharing request information having the form of a control signal or message.

When receiving the time sharing request information from the first electronic device, the electronic device determines whether to permit the time sharing request of the first electronic device in operation 1003. For example, the electronic device may display the time sharing request information on the display unit 260 as illustrated in FIG. 12B. Thereafter, the electronic device may determine whether to share time information with the counterpart electronic device based on whether "YES" or "NO" is selected according to input information provided through the input device 270. As another example, the electronic device may determine whether to share time information with the first electronic device in consideration of the authentication information of the first electronic device included in the time sharing request information.

When not permitting the time sharing request of the first electronic device, the electronic device ends the algorithm. In this case, the electronic device may transmit response information indicating that sharing of time information is not permitted to the first electronic device.

On the other hand, when permitting the time sharing request of the first electronic device, the electronic device proceeds to operation 1005 and identifies the time information of the electronic device and the first electronic device. For example, the electronic device may identify the time information of the electronic device in consideration of the standard time in an area where the electronic device is located. In addition, the electronic device may identify the time information of the first electronic device included in the time sharing request information provided from the first electronic device.

In operation 1007, the electronic device determines whether the time information of the electronic device is identical to that of the first electronic device.

When the time information of the electronic device is identical to that of the first electronic device, the electronic device determines whether the time information of the electronic device is changed in operation 1013. For example, the electronic device determines whether the electronic device moves to an area using a different standard time.

On the other hand, when the time information of the electronic device is not identical to that of the first electronic device, the electronic device proceeds to operation 1009 and transmits response information including the time information of the electronic device to the first electronic device. In this case, the electronic device may transmit the location information of the electronic device using the time information of the electronic device.

After transmitting the response information including the time information to the first electronic device, the electronic device registers the time sharing information of the electronic device in a server in operation 1011. Herein, the time sharing information may include the time information of the electronic device and information about at least one counterpart electronic device which shares time information with the electronic device.

In operation 1013, the electronic device determines whether the time information of the electronic device is changed. For example, the electronic device determines whether the electronic device moves to an area using a different standard time.

When the time information of the electronic device is not changed, the electronic device determines whether time change information is received from the server in operation 1017.

On the other hand, when the time information of the electronic device is changed, the electronic device proceeds to operation 1015 and transmits the time change information to the server. In this case, the electronic device transmits the time change information, configured in the form of a control signal or message, to the server.

In operation 1017, the electronic device determines whether time change information is received from the server.

When the time change information is not received from the server, the electronic device determines whether the time information of the electronic device is changed in operation 1013.

On the other hand, when receiving the time change information from the server, the electronic device proceeds to operation 1019 and changes the time information of the counterpart electronic device of which the time information has been changed according to the time change information provided from the server. For example, when receiving the time change information of the first electronic device from the server, the electronic device changes the time information 1210 of the first electronic device to "Texas" as illustrated in FIG. 12D according to the time change information provided from the server.

As described above, when permitting the time sharing request of the first electronic device, the electronic device transmits time information with the first electronic device. When a display event occurs, the electronic device may display the time information of the first electronic device on the display unit.

Figure 11:
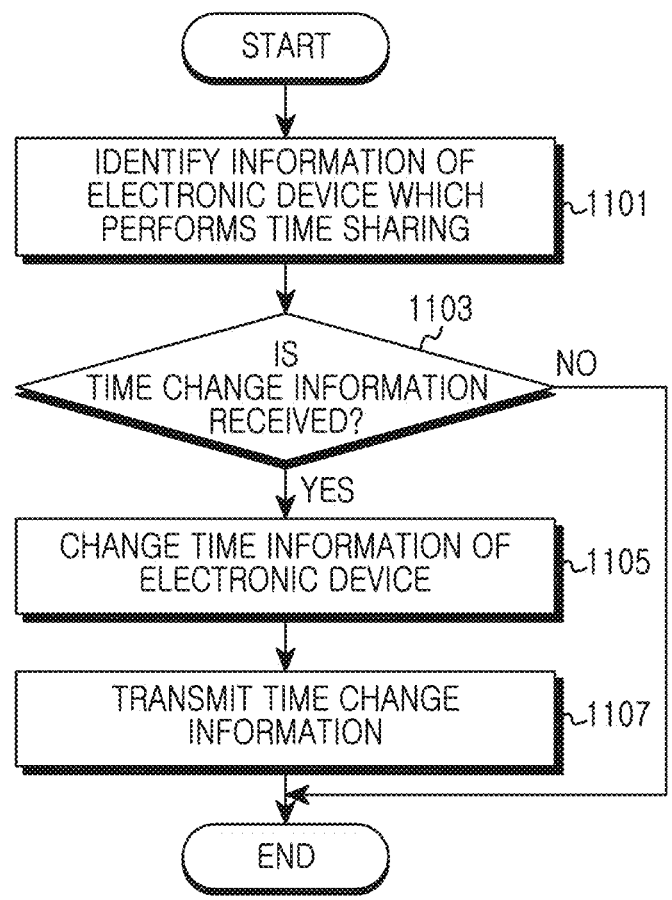
FIG. 11 is a diagram illustrating a process of performing control to enable electronic devices to share time information with each other in a server according to an embodiment of the present disclosure.

FIG. 11 is a diagram illustrating a process of performing control to enable electronic devices to share time information with each other in a server according to an embodiment of the present disclosure.

Referring to FIG. 11, the server identifies the time sharing information of the electronic device that performs time sharing in operation 1101. For example, the server 700 is provided with the time information and time sharing lists of the respective electronic devices 700 and 720 from the first electronic device 700 and the second electronic device 720 that permit the sharing of time information as illustrated in FIG. 7. Herein, the time sharing list may include information about at least one counterpart electronic device which shares time information with the electronic device.

In operation 1103, the server determines whether time change information is received.

When the time change information is received, the server proceeds to operation 1105 and updates the time information of the electronic device according to the time change information. For example, when receiving the time change information from the first electronic device, the server may change the time information of the first electronic device according to the time change information. As another example, when receiving the time change information from the second electronic device, the server may change the time information of the second electronic device according to the time change information.

In operation 1107, the server transmits the time change information to at least one counterpart electronic device included in the time sharing list of the electronic device.

After transmitting the time change information, the server may return to operation 1103 to determine whether time change information is received for another device. Alternatively, the server may end the process of FIG. 11.

In the above-described embodiment, the server may transmit the time change information of the electronic devices.

In another embodiment, the server may transmit the time sharing request, response information, and time change information of the electronic devices. For example, when the first electronic device makes a request to the second electronic device for time sharing, the server may store the time information of the first electronic device and transmit time sharing request information to the second electronic device. When the second electronic device permits time sharing, the server may add the second electronic device to the time sharing list of the first electronic device and transmit the time information of the second electronic device to the first electronic device.

In the above-described embodiment, the electronic devices that perform sharing of time information may transmit time change information to a counterpart electronic device when time information is changed.

In another embodiment, the electronic devices that perform sharing of time information may periodically transmit time information to the counterpart electronic device.

As described above, the electronic device shares time information with the counterpart electronic device for a communication server before provision of the communication service, thereby allowing the user of the electronic device to recognize the time information of the counterpart electronic device, and smoothly providing the communication service.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    transmitting, to a counterpart electronic device, a signal for requesting information comprising a local time of the counterpart electronic device;
    if the information is received from the counterpart electronic device in a reference period, determining first time information of the counterpart electronic device according to the local time of the counterpart electronic device;
    if the information is not received in the reference period, determining the first time information according to a local time of the electronic device;
    when an application program for displaying time information is executed, displaying the determined first time information on a user interface (UI) for the application program;
    determining whether second time information of the electronic device is changed after the determining of the first time information of the counterpart electronic device; and
    when the second time information of the electronic device is changed, transmitting the changed second time information of the electronic device to the counterpart electronic device,
    wherein the determining of whether the second time information is changed comprises determining whether the local time of the electronic device is changed according to a movement of the electronic device.

2. The method of claim 1,
    wherein the signal transmitted to the counterpart electronic device comprises the local time of the electronic device, and
    wherein the information is transmitted in response to determining that the local time of the counterpart electronic device is not identical to the local time of the electronic device.

3. The method of claim 1, further comprising:
    when time change information of the counterpart electronic device is received, changing the first time information of the counterpart electronic device according to the time change information; and
    when the application program is executed, displaying the changed time information on the UI.

4. The method of claim 1,
    wherein the transmitting of the changed second time information to the counterpart electronic device comprises,
    when the second time information of the electronic device is changed, transmitting the changed second time information of the electronic device to a server, and
    wherein the server includes time sharing information of the electronic device.

5. The method of claim 4, wherein the time sharing information includes at least one of the second time information of the electronic device and information about at least one counterpart electronic device which shares time information with the electronic device.

6. The method of claim 1, further comprising:
    when time change information of the counterpart electronic device is received, identifying location information of the counterpart electronic device included in the time change information; and
    changing the first time information of the counterpart electronic device according to the identified location information of the counterpart electronic device.

7. The method of claim 1, further comprising:
    storing the determined first time information of the counterpart electronic device in a memory; and
    replacing the stored first time information of the counterpart electronic device with received time change information.

8. The method of claim 1,
    wherein the signal for requesting the information comprises authentication information, and
    wherein the authentication information is used to determine whether to transmit the information by the counterpart electronic device.

9. An electronic device, comprising:
    a communication unit;
    a display unit; and
    at least one processor,
    wherein the at least one processor is configured to:
        transmit, to a counterpart electronic device, a signal for requesting information comprising a local time of the counterpart electronic device,
        if the information is received from the counterpart electronic device in a reference period, determine first time information of the counterpart electronic device according to the local time of the counterpart electronic device,
        if the information is not received in the reference period, determine the first time information according to a local time of the electronic device,
        when an application program for displaying time information is executed, display the determined first time information of the counterpart electronic device on a user interface (UI) for the application program,
        determine whether second time information of the electronic device is changed after determining the first time information of the counterpart electronic device,
        when the second time information of the electronic device is changed, transmit the changed second time information of the electronic device to the counterpart electronic device, and
        determine whether the local time of the electronic device is changed according to a movement of the electronic device.

10. The electronic device of claim 9,
    wherein the signal transmitted to the counterpart electronic device comprises the local time of the electronic device, and wherein the information is transmitted in response to determining that the local time of the counterpart electronic device is not identical to the local time of the electronic device.

11. The electronic device of claim 9, wherein the at least one processor is further configured to:
   when time change information of the counterpart electronic device is received, change the first time information of the counterpart electronic device according to the time change information, and
   when the application program is executed, display the changed time information on the UI.

12. The electronic device of claim 9, wherein, when the second time information of the electronic device is changed, the at least one processor is further configured to transmit the changed second time information of the electronic device to a server including time sharing information of the electronic device.

13. The electronic device of claim 12, wherein the time sharing information includes at least one of the second time information of the electronic device and information about at least one counterpart electronic device which shares time information with the electronic device.

14. The electronic device of claim 9, wherein the at least one processor is further configured to:
   when time change information of the counterpart electronic device is received, identify location information of the counterpart electronic device included in the time change information, and
   change the first time information of the counterpart electronic device according to the identified location information of the counterpart electronic device.

15. The electronic device of claim 9,
   wherein the signal for requesting the information comprises authentication information, and
   wherein the authentication information is used to determine whether to transmit the information by the counterpart electronic device.

* * * * *